(12) United States Patent
Dandy et al.

(10) Patent No.: US 11,354,726 B2
(45) Date of Patent: Jun. 7, 2022

(54) CHANGE ORDER APPLICATION PROGRAMMING INTERFACES

(71) Applicant: salesforce.com, inc., San Francisco, CA (US)

(72) Inventors: Michael Dandy, San Francisco, CA (US); Danil Dvinov, San Francisco, CA (US); Gaurav Salkar, San Francisco, CA (US); Susan S. Levine, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 61 days.

(21) Appl. No.: 16/723,629

(22) Filed: Dec. 20, 2019

(65) Prior Publication Data

US 2021/0192601 A1    Jun. 24, 2021

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0635* (2013.01); *G06Q 30/0239* (2013.01); *G06Q 30/0283* (2013.01); *G06Q 30/0621* (2013.01); *G06Q 30/0641* (2013.01)

(58) Field of Classification Search
CPC .......... G06Q 30/0635; G06Q 30/0239; G06Q 30/0283; G06Q 30/0621; G06Q 30/0641
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |

(Continued)

OTHER PUBLICATIONS

Zammetti, Frank W. "Shopping in Style: A Drag-and-Drop Shopping Cart." Practical JavaScript™, DOM Scripting, and Ajax Projects (2007): 351-401.*

*Primary Examiner* — Kathleen Palavecino
(74) *Attorney, Agent, or Firm* — Schwabe Williamson & Wyatt

(57) ABSTRACT

Disclosed embodiments are related to Application Programming Interface (API) technologies, and in particular, to Order APIs that are used to make modifications and cancelations to existing order objects. The Order APIs can be used to retrieve the current state of an order object, retrieve the summarized state of an order object as of a specified date, and retrieve a potential state of an order object along with specified changes. The Order APIs are also used to process order changes including changes to the quantity of an existing order object and applying line item changes to an existing order object. Other embodiments may be described and/or claimed.

20 Claims, 21 Drawing Sheets

(56) References Cited

U.S. PATENT DOCUMENTS

| | | | |
|---|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,447,745 B2 | 5/2013 | Ahuja et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,782,605 B2 | 7/2014 | Dvinov et al. |
| 9,098,365 B2 | 8/2015 | Smith et al. |
| 9,244,954 B2 | 1/2016 | Ziemann et al. |
| 9,495,403 B2 | 11/2016 | Nachnani et al. |
| 9,720,993 B2 | 8/2017 | Ziemann et al. |
| 9,740,743 B2 | 8/2017 | Jagota et al. |
| 10,152,497 B2 | 12/2018 | Doan et al. |
| 10,235,476 B2 | 3/2019 | Vaishnav et al. |
| 10,237,336 B2 | 3/2019 | Dvinov et al. |
| 10,387,388 B2 | 8/2019 | Doan et al. |
| 10,504,131 B1* | 12/2019 | Raipati ............. G06Q 30/0635 |
| 10,521,406 B2 | 12/2019 | Vaishnav et al. |
| 10,733,613 B2 | 8/2020 | Vaishnav et al. |
| 10,901,996 B2 | 1/2021 | Doan et al. |
| 10,915,519 B2 | 2/2021 | Dandy |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0111877 A1* | 8/2002 | Nelson ................. G06Q 10/06 705/26.62 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |

(56) References Cited

U.S. PATENT DOCUMENTS

| | | |
|---|---|---|
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0066672 A1 | 3/2012 | Smith et al. |
| 2012/0084090 A1* | 4/2012 | Woodard ............... G06Q 30/00 705/1.1 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0358745 A1* | 12/2014 | Lunan ................... G06Q 40/12 705/30 |
| 2014/0359537 A1 | 12/2014 | Jackobson et al. |
| 2016/0085801 A1 | 3/2016 | Hellbusch et al. |
| 2016/0247245 A1* | 8/2016 | Baic ............... G06F 21/6209 |
| 2017/0018013 A1* | 1/2017 | Faust ................ G06Q 30/0283 |
| 2017/0286441 A1 | 10/2017 | Doan et al. |
| 2017/0293629 A1 | 10/2017 | Doan et al. |
| 2020/0250189 A1 | 8/2020 | Dvinov et al. |

* cited by examiner

CHANGE ORDER APPLICATION PROGRAMMING INTERFACES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database systems and cloud computing systems, and in particular to application programming interfaces (APIs) for interacting with such database and cloud computing systems.

BACKGROUND

Multi-tenant database systems allow tenants to share database resources in one logical database. The databases themselves are typically shared, and each tenant is typically associated with an organization identifier (org ID) column or field that may be used to identify rows or records belonging to each tenant. Each tenant may provide their own custom data, which may include defining custom objects and custom fields, as well as designating one or more custom fields to act as custom index fields.

Some tenants operate their own platforms to provide services to their own subscribers or users. As an example, such platforms may include ecommerce applications and services such as digital retail applications and order and payment processing application (e.g., shopping cart applications). These tenants may develop applications that interact or integrate with the multi-tenant database system and utilize data from an associated tenant space. The tenant platforms/applications may access and/or update tenant data based on various user interactions with the applications/platforms. Often, the integration with the multi-tenant database system is accomplished through application-based application programming interfaces (APIs).

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIGS. 5-19 illustrate various example graphical user interfaces (GUIs) implementing the Order APIs according to various embodiments discussed herein. In particular, FIGS. 5-8 show various instances of an example GUI at various stages of cancelling an active order; FIGS. 9-12 show various instances of an example GUI at various stages of applying a discount to an order total; FIGS. 13-16 show various instances of an example GUI at various stages of applying a discount to an individual items; and FIGS. 17-19 show various instances of an example GUI at various stages of applying a discount to shipping costs.

DETAILED DESCRIPTION

Figure 1A:
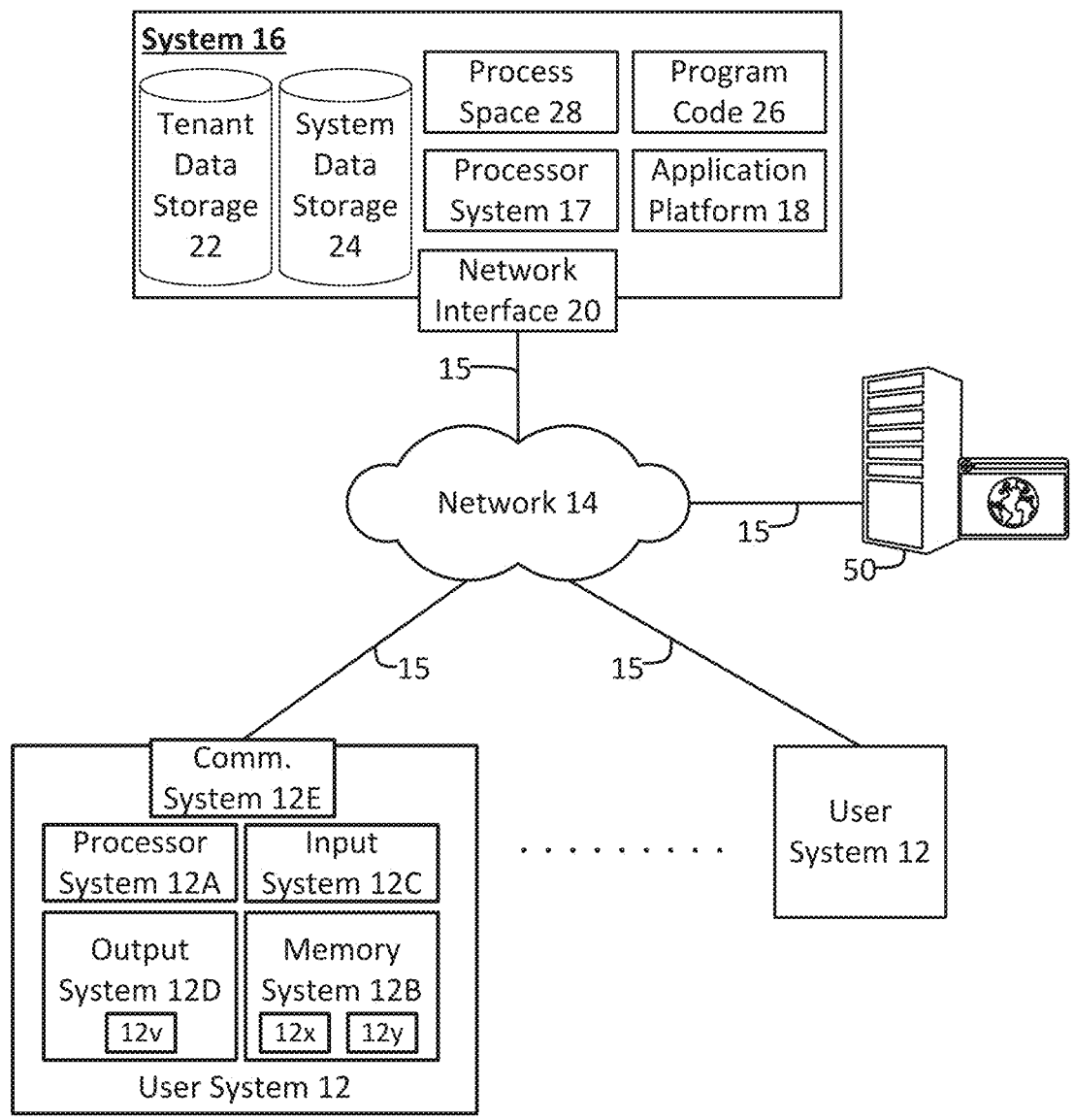
FIG. 1A shows an example environment in which an on-demand database service can be used according to various embodiments.

Disclosed embodiments are related to order management and ecommerce related services. Order management systems are applications and services used for order entry and processing. An order is an object (e.g., a database object) that represents an agreement between a product/service provider and a consumer to provision services or deliver products of a known quantity, price, and at a certain date. Order management involves handling the events that occur during an order's life cycle such as: order creation (e.g., an order comes into the system from any sales channel, generating a new sales order record), payment capture (e.g., payment information is collected and sent to an external payment processor), allocation (e.g., one or more shipping order records are created, and items in the sales order are allocated to them from inventory), fulfillment (e.g., picking, packaging, and shipping the purchased item), and returns/exchanges. Order objects in database systems (e.g., tenant database systems and the like) are immutable in order to maintain business and financial integrity, especially for auditing purposes.

Currently, it is difficult to modify order objects after they are activated. In order to modify an existing order, the user has to submit a change order, which is basically another order that the user relates to the original order. The underlying logic evaluates the change order and the original order, and applies the modification. Numerous change orders may end up being submitted to the tenant system to, for example, fix a mistake made in a previous change order, apply a discount or taxes to an order, and the like. However, executing the transactions for these superfluous change orders consumes computing, storage, and network resources.

Embodiments include Order APIs, which are used to make modifications and cancelations to existing order objects (e.g., after activation of the original Order). The Order APIs include an Order Retrieve API and an Order Change API. The Order Retrieve API can be used to retrieve the current state of an Order, retrieve the summarized state of an Order as of a specified date (e.g., a selected date, month, quarter, end of a fiscal year, or the like), and retrieve a potential state of an Order along with specified changes (e.g., line item changes, etc.). This allows users to see existing orders with desired changes without writing those changes to the underlying database. As an example, this capability may be beneficial for financial reporting purposes, processing bookings, updating a shopping cart application based on added or deleted items and/or changed shipping locations, and/or the like.

The Order Change API handles the business logic to process order changes including changes to the quantity of an existing order (e.g., due to order cancellations, or returns) and applying line item changes to an existing order. The quantity changes may include, for example, order item reductions, order cancellations, order item increases, and the like. The line item changes may include, for example, item price discounts, shipping cost increases/reductions, tax adjustments, and/or other like adjustments. The business logic processes order line item changes, for example, by identifying items that are eligible to be cancelled based on a fulfillment status of the order, determining if shipping costs should be adjusted or cancelled, determining if discounts should be applied or cancelled, determining if the order is eligible for price changes including increases or decreases, and computing order lines, taxes, and adjustment prices. Other embodiments may be described and/or disclosed.

As alluded to previously, sending numerous requests to update order objects can be computationally intensive and can consume large amounts of computing, storage, and network resources, at least from the perspective of the cloud computing or database system. The Order API embodiments described by the present disclosure reduce resource consumption by allowing users to view an order object status with selected changes without committing those changes to the underlying data. The embodiments discussed herein are a technological improvements in that the embodiments reduce the overall number of transactions that need to be processed, which allows the cloud computing and/or database system to reduce network, storage, and computing resource overhead associated with receiving, processing, and executing the transactions.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods includes more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Example embodiments of the present disclosure may be described in terms of a multitenant and/or cloud computing architecture or platform. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Multi-tenancy is a feature of cloud computing where physical or virtual resources are allocated in such a way that multiple tenants and their computations and data are isolated from and inaccessible to one another. As used herein, the term "tenant" refers to a group of users (e.g., cloud service users) who share common access with specific privileges to a software instance and/or a set of computing resources. Tenants may be individuals, organizations, or enterprises that are customers or users of a cloud computing service or platform. However, a given cloud service customer organization could have many different tenancies with a single cloud service provider representing different groups within the organization. A multi-tenant platform or architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, Inc. of San Francisco, Calif. salesforce.com, Inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, Inc. and can be implemented in the context of various other database systems such as cloud-based systems that are not part of a multi-tenant database system or which do not provide enterprise social networking services.

I. Example System Overview

FIG. 1A shows an example of an environment 10 in which on-demand services (e.g., cloud computing services and/or database services) can be used in accordance with various embodiments. The environment 10 includes user systems 12, a network 14, system 16 (also referred to herein as a "cloud-based system," "database system," "cloud computing service," or the like), and one or more customer platforms (CPs) 50. The cloud system 16 includes a processor system 17, an application platform 18, a network interface 20, tenant database (DB) 22 for storing tenant data 23 (see e.g., FIG. 1B), system DB 24 for storing system data 25 (see FIG. 1B), program code 26 for implementing various functions of the system 16, and process space 28 for executing DB system processes and tenant-specific processes, such as running applications as part of an application hosting service. In some other implementations, environment 10 may not have all of these components or systems, or may have other components or systems instead of, or in addition to, those listed above.

Figure 1B:
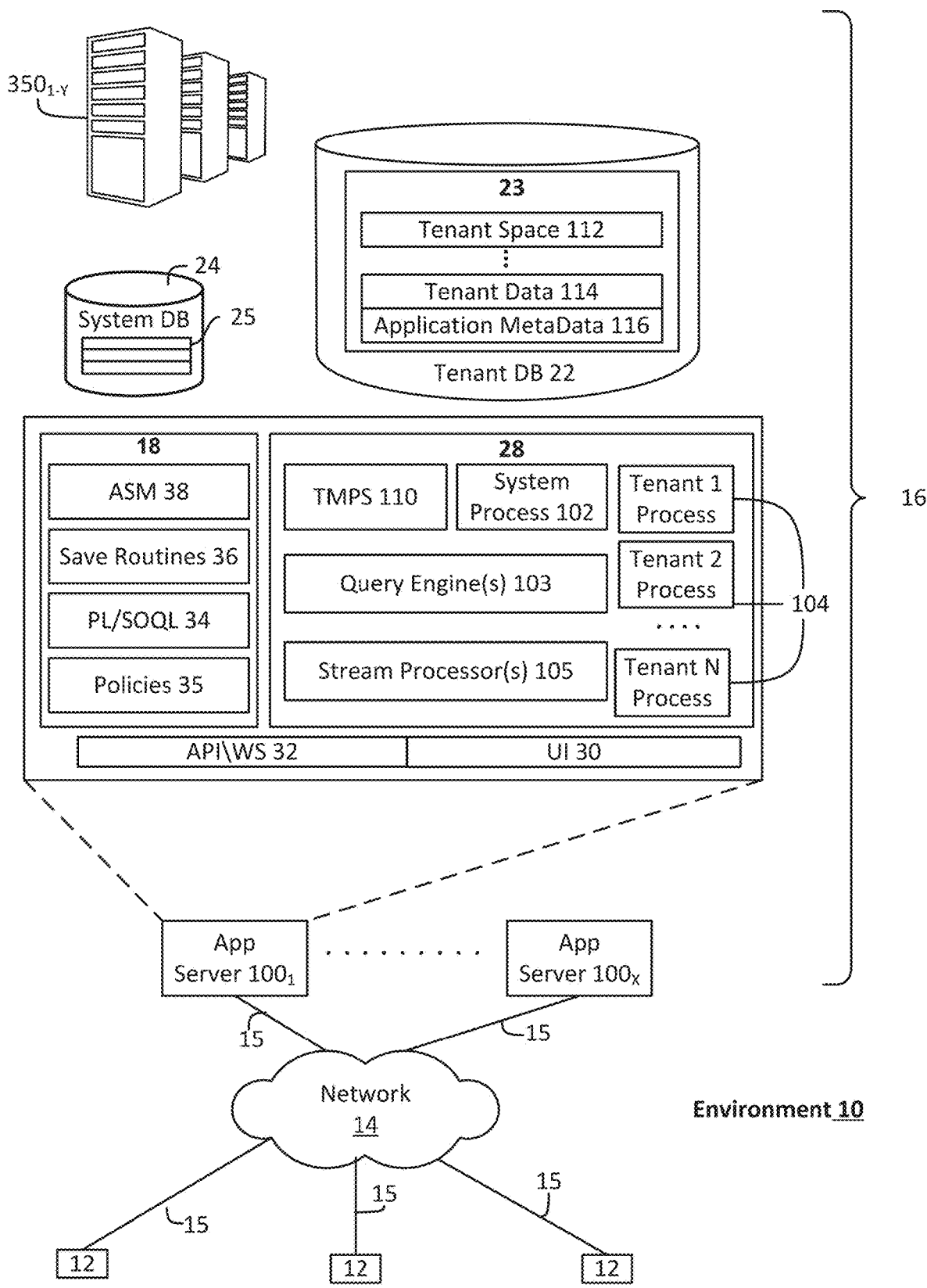
FIG. 1B shows an example implementation of elements of FIG. 1A and example interconnections between these elements according to various embodiments.

The system 16 may be a DB system and/or a cloud computing service comprising a network or other interconnection of computing systems (e.g., servers, storage devices, applications, etc., such as those discussed with regard to FIGS. 1A-1B infra) that provides access to a pool of physical and/or virtual resources. In some implementations, the system 16 is a multi-tenant DB system and/or a multi-tenant cloud computing platform. In some implementations, the system 16 provides a Communications as a Service (CaaS), Compute as a Service (CompaaS), Database as a Service (DaaS), Data Storage as a Service (DSaaS), Firewall as a Service (FaaS), Infrastructure as a Service (IaaS), Network as a Service (NaaS), Platform as a Service (PaaS), Security as a Service, Software as a Service (SaaS), and/or other like cloud services.

In some implementations, the environment 10 is an environment in which an on-demand DB service exists. An on-demand DB service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand DB services can store information from one or more tenants into tables of a common DB image to form a multi-tenant DB system (MTS). The term "multi-tenant DB system" can refer to those systems in which various elements of hardware and software of a DB system may be shared by one or more customers or tenants. For example, a given application server may simultaneously process requests for a great number of customers, and a given DB table may store rows of data such as feed items for a potentially much greater number of customers. A DB image can include one or more DB objects. A relational DB management system (RDBMS) or the equivalent can execute storage and retrieval of information against the DB object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand DB service, users accessing the on-demand DB service via user systems 12, or third party application developers accessing the on-demand DB service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a DB system related data, objects, and web page content. In some MTS implementations, data for multiple tenants may be stored in the same physical DB object in tenant DB 22. In some such implementations, tenant data is arranged in the storage medium(s) of tenant DB 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more DB objects and the execution of the applications in one or more virtual machines in the process space of the system 16. The applications of the application platform 18 may be developed with any suitable programming languages and/or development tools, such as those discussed herein. The applications may be built using a platform-specific and/or proprietary development tool and/or programming languages, such as those discussed herein.

In embodiments, the tenant data storage 22, the system data storage 24, and/or some other data store (not shown) include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or DB, and, in some instances, a DB application (e.g., OODBMS or RDBMS) as is well known in the art. It should also be understood that "server system" and "server" are often used interchangeably herein. Similarly, the DB objects (DBOs) described herein can be implemented as part of a single DB, a distributed DB, a collection of distributed DBs, a DB with redundant online or offline backups or other redundancies, etc., and can include a distributed DB or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Internet Protocol (IP), Internet Protocol Security (IPsec), Session Initiation Protocol (SIP) with Real-Time Transport Protocol (RTP or Secure RTP (SRTP), Internet Control Message Protocol (ICMP), User Datagram Protocol (UDP), QUIC (sometimes referred to as "Quick UDP Internet Connections"), Stream Control Transmission Protocol (SCTP), Web-based secure shell (SSH), Extensible Messaging and Presence Protocol (XMPP), WebSocket protocol, Internet Group Management Protocol (IGMP), Internet Control Message Protocol (ICMP), etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include code or source code documents (e.g., HTML, XML, JSON, Apex®, CSS, JSP, MessagePack™, Apache® Thrift™, ASN.1, Google® Protocol Buffers (protobuf), DBOs, or some other like object(s)/document(s)). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (e.g., a "smartphone"), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As shown by FIG. 1A, the user system 12 includes a processor system 12A, which can include any suitable combination of one or more processors, such as one or more central processing units (CPUs) including single-core or multi-core processors (such as those discussed herein), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), System-on-Chips (SoCs) and/or programmable SoCs, microprocessors or controllers, or any other electronic circuitry capable of executing program code and/or software modules to perform arithmetic, logical, and/or input/output operations, or any suitable combination thereof. As examples, the processor system 12A may include Intel® Pentium® or Core™ based processor(s); AMD Zen® Core Architecture processor(s), such as Ryzen® processor(s) or Accelerated Processing Units (APUs), MxGPUs, or the like; A, S, W, and T series processor(s) from Apple® Inc.; Snapdragon™ processor(s) from Qualcomm® Technologies, Inc., Texas Instruments, Inc.® Open Multimedia Applications Platform (OMAP)™ processor(s); MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; GeForce®, Tegra®, Titan X®, Tesla®, Shield®, and/or other like GPUs provided by Nvidia®; and/or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (e.g., application(s) 12y and/or other applications discussed herein) for carrying out the procedures, processes, methods, etc. of the embodiments discussed herein, as well as an operating system (OS) 12x and one or more DBs or DBOs (not shown).

The application(s) 12y (also referred to as "app 12y" or "apps 12y") is/are a software application designed to run on the user system 12 and is used to access data stored by the system 16. The apps 12y may be platform-specific, such as when the user system 12 is implemented in a mobile device, such as a smartphone, tablet computer, and the like. The apps 12y may be a native application, a web application, or a hybrid application (or variants thereof). One such app 12y may be the previously discussed HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (e.g., a subscriber of on-demand services provided by the system 16) of the user system 12 to access, process and view information, pages, interfaces (e.g., UI 30 in FIG. 1B), and application(s) 12y available to it from the system 16 over the network 14. In other implementations, each user system 12 may operate a web or user app 12y designed to interact with applications of the application platform 18 allowing a user (e.g., a subscriber of on-demand services provided by the system 16) of the user system 12 to access, process and view information, pages, interfaces (e.g., UI 30 in FIG. 1B), and apps 12y available to it from the system 16 over the network 14. In some cases, an owner/operator of system 16 may have pre-built the web or user apps 12y for use by clients, customers, and/or agents of a tenant organization (org) to access a tenant space or enterprise social network of that tenant org. In some cases, developers associated with a tenant org (e.g., CP 50) may build custom application(s) for interacting with the tenant data. The user (or third party) application(s) may be native application(s) (e.g., executed and rendered in a container) or hybrid application(s) (e.g., web applications being executed/rendered in a container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the system 16, and/or a platform of a third party system/platform. The web, user, or third party application(s) 12y discussed herein may be a software, program code, logic modules, application packages, etc. that are built using one or more programming languages and/or development tools, such as those discussed herein. Furthermore, such applications may utilize a suitable querying language to query and store information in an associated tenant space, such as, for example, the various query languages discussed herein or the like. The apps 12y may be developed using any suitable programming language and/or development tools such as any of those discussed herein. In some implementations, the apps 12y may be developed using platform-specific development tools and/or programming languages such as those discussed herein.

In an example, the user systems 12 may implement web, user, or third party apps 12y to request and obtain data from system 16, and render graphical user interfaces (GUIs) in an application container or browser. These GUIs may correspond with GUI 12v and/or UI 30 shown and described with respect to FIG. 1B. In some implementations, the GUIs may include a data analytics GUI, such as Salesforce® Wave™ dashboard, which may provide visual representations of data (also referred to as visual representations 12v or the like) residing in an enterprise cloud or in an on-demand services environment (e.g., a tenant space within system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of DB 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user_id), password, personal identification number (PIN), digital certificates, etc.) to the system 16 so that the system 16 may authenticate the identity of a user of the user system 12.

Each user system 12 typically includes an operating system (OS) 12x to manage computer hardware and software resources, and provide common services for various apps 12y. The OS 12x includes one or more drivers and/or APIs that provide an interface to hardware devices thereby enabling the OS 12x and applications to access hardware functions. The OS 12x includes middleware that connects two or more separate applications or connects apps 12y with underlying hardware components beyond those available from the drivers/APIs of the OS 12x. The OS 12x may be a general purpose OS or a platform-specific OS specifically written for and tailored to the user system 12.

The input system 12C can include any suitable combination of input devices, such as touchscreen interfaces, touchpad interfaces, keyboards, mice, trackballs, scanners, cameras, a pen or stylus or the like, or interfaces to networks. The input devices of input system 12C may be used for interacting with a GUI provided by the browser/application container on a display of output system 12D (e.g., a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. The output system 12D can include any suitable combination of output devices, such as one or more display devices, printers, or interfaces to networks. The output system 12D is used to display visual representations and/or GUIs 12v based on various user interactions. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the system 16. Communications system 12E may include one or more processors (e.g., baseband processors, network interface controllers, etc.) that are dedicated to a particular wireless communication protocol (e.g., WiFi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the system 16, the user system 12 using the communications system 12E may establish link 15 with network interface 20 of the system 16.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and DB information accessible by a lower permission level user, but may not have access to certain applications, DB information, and data accessible by a user at a higher permission level. Thus, different users generally will have different capabilities with regard to accessing and modifying application and DB information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices (e.g., processor system 12B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, Advanced Micro Devices (AMD) Zen® Core Architecture processor(s), such as Ryzen® or Epyc® processor(s), Accelerated Processing Units (APUs), MxGPUs, or the like; ARM-based processor(s) licensed from ARM Holdings, Ltd. such as the ARM Cortex-A family of processors and the ThunderX2® provided by Cavium™, Inc.; Centrig™ processor(s) from Qualcomm® Technologies, Inc.; Power Architecture processor(s) provided by the OpenPOWER® Foundation and/or IBM®; GeForce®, Tegra®, Titan X®, Tesla®, Shield®, and/or other like GPUs provided by Nvidia®; a MIPS-based design from MIPS Technologies, Inc. such as MIPS Warrior P-class processors; and/or the like, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

The CP 50 includes one or more physical and/or virtualized systems for providing content and/or functionality (i.e., services) to one or more clients (e.g., user system 12) over a network (e.g., network 14). The physical and/or virtualized systems include one or more logically or physically connected servers and/or data storage devices distributed locally or across one or more geographic locations. Generally, the CP 50 is configured to use IP/network resources to provide web pages, forms, applications, data, services, and/or media content to different user system 12. As examples, the CP 50 may provide search engine services; social networking and/or microblogging services; content (media) streaming services; e-commerce services; communication services such as Voice-over-Internet Protocol (VoIP) sessions, text messaging, group communication sessions, and the like; immersive gaming experiences; and/or other like services. The user systems 12 that utilize services provided by CP 50 may be referred to as "subscribers" of CP 50 or the like. Although FIG. 1A shows only a single CP 50, the CP 50 may represent multiple individual CPs 50, each of which may have their own subscribing user systems 12.

CP 50 (also referred to as a "service provider platform", "tenant", "tenant organization", or the like) may be a customer or tenant of the system 16 that develops applications that interact and/or integrate with the system 16 and utilize data from an associated tenant space in tenant DB 22; these applications may be referred to as "customer apps," "CP apps," or the like. The term "customer platform" or "CP" as used herein may refer to both the platform and/or applications themselves, as well as the owners, operators, and/or developers associated with the customer platform. The CP apps may obtain data from the associated tenant space to render/display visual representations of relevant tenant data. In some cases, the CP apps utilize tenant data for interacting with user systems 12 by, for example, sending messages to various user systems 12 (e.g., subscribers of the CP 50) via the system 16. To do so, the CP apps include program code or script(s) that call an API/WS 32 (see e.g., FIG. 1B) to create and execute the sending of these messages based on predefined events/conditions and/or triggering events. As discussed in more detail infra, the CP apps include program code/scripts that call APIs/WS 32 (see e.g., FIG. 1B) to schedule and send messages to individual subscribers.

FIG. 1B shows example implementations of elements of FIG. 1A and example interconnections between these elements according to some implementations. That is, FIG. 1B also illustrates environment 10, but FIG. 1B shows various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. In other implementations, the environment 10 may not have the same elements as those shown by FIG. 1B or may have other elements instead of, or in addition to, those listed.

In FIG. 1B, the network interface 20 and/or processor system 17 is/are implemented as a set of application servers 100₁-100x (where X is a number) Each application server 100 (also referred to herein as an "app server", an "API server", an "HTTP application server," a "worker node", and/or the like) is configured to communicate with tenant DB 22 and the tenant data 23 therein, as well as system DB 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space (TMPS) 110. In various embodiments, the process space 28 includes one or more query processors 103 and one or more stream processors 105.

The stream processor(s) 105 are systems and/or applications that send or receive data streams and execute the applications or analytics logic in response to detecting events or triggers from the data streams. The stream processor(s) 105 process data directly as it is produced or received and detect conditions from the data streams within a relatively small time period (e.g., measured in terms of milliseconds to minutes). The stream processor(s) 105 may be implemented as software components (e.g., software engines, software agents, artificial intelligence (AI) agents, modules, objects, or other like logical units), as individual hardware elements, or a combination thereof. In an example software-based implementation, the stream processor(s) 105 may be developed using a suitable programming language, development tools/environments, etc., which are executed by one or more processors of one or more computing systems (see e.g., processor system 17 of FIG. 1A). In this example, program code of the stream processor(s) 105 may be executed by a single processor or by multiple processing devices. In an example hardware-based implementation, the stream processor(s) 105 are implemented by respective hardware elements, such as GPUs (or floating point units within one or more GPUs), hardware accelerators (e.g., FPGAs, ASICs, DSPs, SoCs, etc.) that are configured with appropriate logic blocks, bit stream(s), etc. to perform their respective functions, AI accelerating co-processor(s), tensor processing units (TPUs), and/or the like. In some embodiments, the stream processor(s) 105 may be implemented using stream processor(s), which are systems and/or applications that send or receive data streams and execute the applications or analytics logic in response to detecting events or triggers from the data streams. The stream processor(s) 105 process data directly as it is produced or received and detect conditions from the data streams within a relatively small time period (e.g., measured in terms of milliseconds to minutes). The stream processor(s) may be implemented using any stream/event processing engines or stream analytics engines such as, for example, Apache® Kafka®, Apache® Storm®, Apache® Flink®, Apache® Apex®, Apache® Spark®, IBM® Spade, Nvidia® CUDA™, Intel® Ct™, Ampa™ provided by Software AGO, StreamC™ from Stream Processors, Inc., and/or the like.

The application platform 18 includes an application setup mechanism (ASM) 38 that supports application developers' ("app developers") creation and management of applications. Such applications and others can be saved as metadata into tenant DB 22 by save routines (SRs) 36 for execution by subscribers as one or more tenant process spaces 104 managed by tenant management process 110, for example. Invocations to such applications can be coded using Procedural Language (PL)/Salesforce® Object Query Language (SOQL) 34, which provides a programming language style interface extension to Application Programming Interface (API) 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

In some implementations, the application platform 18 also includes policies 35. The policies 35 comprise documents and/or data structures that define a set of rules that govern the behavior of the various subsystems of the app server 100. For example, one or more of the policies 35 may dictate how to handle network traffic for specific network addresses (or address ranges), protocols, services, applications, content types, etc., based on an organization's information security (infosec) policies, regulatory and/or auditing policies, access control lists (ACLs), and the like. Additionally, the policies 35 can specify (within various levels of granularity) particular users, and user groups, that are authorized to access particular resources or types of resources, based on the org's hierarchical structure, and security and regulatory requirements. The documents or data structures of the policies 35 may include a "description," which is a collection of software modules, program code, logic blocks, parameters, rules, conditions, etc., that may be used by the app server 100 to control the operation of the app server 100 and/or access to various services. Any suitable programming languages, markup languages, schema languages, etc., may be used to define individual policies 35 and instantiate instances of those policies 35. As examples, the policies 35 may be defined using XML, JSON, markdown, IFTTT ("If This Then That"), PADS markup language (PADS/ML), Nettle, Capirca™, and/or some other suitable data format, such as those discussed herein.

The application platform 18 may be, or may include, a development environment, programming language(s), and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist an app developer in building applications, configurations, definitions, and/or the like. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., system 16) in a web browser or application container).

As mentioned previously, CPs 50 may be customers or tenants of the system 16 that develop CP apps that interact and/or integrate with the system 16 and utilize data from an associated tenant space in tenant DB 22. For example, CP apps may include or provide storefront applications/services, point-of-sale (PoS) applications/services, Warehouse Management System (WMS) applications/services, Enterprise Resource Planning (ERP) applications/services, and/or the like. To integrate with the system 16, the CP apps include program code or script(s) that call the APIs/WS 32 to create and activate orders. The CP apps may also include program code/scripts that call APIs/WS 32 to adjust the orders as discussed herein. The CP apps may also call the APIs/WS 32 to return aggregate statistics about various orders. In some embodiments, the CP apps 50 may be the client app 12y discussed previously, or a web app that is rendered and/or executed by the client app 12y (e.g., where the CP apps 50 are web apps and the client app 12y is a browser or other HTTP client that renders the web apps, executes client-side scripts, and/or the like). In other embodiments, the CP apps 50 may be server-side (e.g., CP 50 side) applications, that interact with the user-facing client app 12y.

The system 16 of FIG. 1B also includes a user interface (UI) 30 and one or more APIs 32 (also referred to as a "web service") to system 16 resident processes, which allow users or developers at user systems 12 to access the resident processes. The API(s) 32 is/are interface(s) for software components to communicate with each other. In some implementations, the API(s) 32 are source code specification(s) or a collection of libraries, routines, methods, data structures, fields, objects, classes, variables, remote calls, and the like that defines how a software element may access or interact with the underlying platform capabilities and features of the CP 50. Developers and programmers can use the API(s) 32 by importing the relevant classes and writing statements that instantiate the classes and call their methods, fields, etc. The application (app) code, app/service templates, and/or policies 35 developed by customer platforms may be pushed or otherwise sent to the system 16 using one or more APIs 32. In these implementations, the app code, app/service templates, and/or policies 35 may be developed using a development (dev) environment, programming language(s), and/or dev-tools provided by the system 16.

In various embodiments, the API(s) 32 includes an Order API (hereinafter "Order API 32"), which allows the CP 50 and/or user systems 12 to poll, query, or otherwise request order objects and datasets programmatically. The Order API 32 gives developers and programmers programmatic access to existing and activated orders (e.g., orders that have been placed and activated), as well as child custom object data of such orders. The Order API 32 also allows developers and programmers to create order objects (or simply "orders") and custom objects records in a single call; add orders to a new or existing contract, and add order items/products to the added orders; add order items/products to a new or existing order; add custom objects to a new or existing contract or order; retrieve orders and custom objects under a given contract; retrieve order item/product records under a given order, and custom object records under the order; and retrieve a filtered list of orders under a given contract or order products under a given order. Various aspects of the Order API 32 are discussed in more detail infra.

The API(s) 32 may be implemented as a remote API or a web API, such as a Representational State Transfer (REST or RESTful) API, Simple Object Access Protocol (SOAP) API, salesforce.com Apex API, and/or some other like API. The API 32 may be implemented as a web service including, for example, Apache® Axi2.4 or Axi3, Apache® CXF, JSON-Remote Procedure Call (RPC), JSON-Web Service Protocol (WSP), Web Services Description Language (WSDL), XML Interface for Network Services (XINS), Web Services Conversation Language (WSCL), Web Services Flow Language (WSFL), RESTful web services, and/or the like.

In some implementations, the API(s) 32 may include one or more public APIs and one or more private APIs. The public APIs are APIs that includes one or more publically exposed endpoints that allows user systems 12 to access tenant data. These endpoints specify where resources are located and/or how particular web services can be accessed. The app(s) 12y (see e.g., FIG. 1A) may be used to generate and transmit a message (e.g., an HTTP message) with a user-issued query and a suitable URI/URL to access of an endpoint of the system 16. In embodiments, one or more of the APIs 32 may be an asynchronous ("async") query API, where the user-issued query includes an API call or other like instruction indicating that a user-issued query should be treated as an aysnc query (referred to as an "async query verb"). The async query verbs to invoke the async query API 32 may be defined and/or coded using PL/SOQL 34 or some other suitable programming or query language. When an async query invokes the async query API, an async query engine (e.g., a query engine 103) or async query scheduler may generate a corresponding async query job. The term "job" as used herein refers to a unit of work or execution that performs work that comprises one or more tasks. Individual jobs may have a corresponding job entity comprising a record or DB object that stores various values, statistics, metadata, etc. during the lifecycle of the job or until the job is executed, which are placed in a schedule or queue and executed from the queue, in turn. An async query job entity corresponding to an async query job is a job entity existing for the during the lifecycle of an async query, which is placed in a schedule or queue and executed by the async query engine, in turn. The async public API may be implemented as a REST or RESTful API, SOAP API, Apex API, and/or some other like API, such as those discussed herein.

Private APIs are APIs 32 that are private or internal to the system 16, which allows system applications (e.g., tenant management process 110, system process 102, query engine(s) 103 and stream processor(s) 105 to access other system applications. The private APIs 32 may be similar to the public APIs 32 except that the endpoints of the private APIs 32 are not publically available or accessible. The private APIs 32 may be made less discoverable by restricting users, devices, and/or applications from calling or otherwise using the private APIs 32. For example, use of the private APIs 32 may be restricted to machines inside a private network (or an enterprise network), a range of acceptable IP addresses, applications with IDs included in a whitelist or subscriber list, requests/calls that include a particular digital certificate or other like credentials, and/or the like. The private APIs may be implemented as a REST or RESTful API, SOAP API, Apex API, a proprietary API, and/or some other like API.

Each application server 100 is communicably coupled with tenant DB 22 and system DB 24, for example, having access to tenant data 23 and system data 25, respectively, via a different network connection 15. For example, one application server 100₁ can be coupled via the network 14 (e.g., the Internet), another application server 100N can be coupled via a direct network link 15, and another application server 100N can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used. The application servers 100 may access the tenant data 23 and/or the system data 25 using suitable private APIs as discussed previously.

In some implementations, each application server 100 is configured to handle requests for any user associated with any organization that is a tenant of the system 16. In this regard, each application server 100 may be configured to perform various DB functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (e.g., an F5 Big-IP load balancer) is communicably coupled between the application servers 100 and the user systems 12 to distribute requests to the application servers 100. In one implementation, the load balancer uses a least-connections algorithm to route user requests to the app servers 100 (see e.g., load balancer 228 of FIGS. 2A-2B discussed infra). Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be an organization (org) that employs a sales force where each salesperson uses system 16 to manage aspects of their sales. A user can maintain contact data, leads data, customer follow-up data, performance data, goals and progress data, etc., all applicable to that user's personal sales process (e.g., in tenant DB 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant DB 22 or system DB 24. The system 16 (e.g., an application server 100 in the system 16) can automatically generate one or more native queries (e.g., SQL statements or SQL queries or the like) designed to access the desired information from a suitable DB. To do so, the system 16 (e.g., an application server 100 in the system 16) may include one or more query engines 103, which is/are a software engine, SDK, object(s), program code and/or software modules, or other like logical unit that takes a description of a search request (e.g., a user query), processes/evaluates the search request, executes the search request, and returns the results back to the calling party. The query engine(s) 103 may be program code that obtains a query from a suitable request message via the network interface 20 that calls a public API, translates or converts the query into a native query (if necessary), evaluates and executes the native query, and returns results of the query back to the issuing party (e.g., a user system 12). To perform these functions, the query engine(s) 103 include a parser, a query optimizer, DB manager, compiler, execution engine, and/or other like components. In some implementations, each of the illustrated DBs may generate query plans to access the requested data from that DB, for example, the system DB 24 can generate query plans to access the requested data from the system DB 24. The term "query plan" generally refers to one or more operations used to access information in a DB system. Additionally, the query engine(s) 103 may control or enforce the order in which queries and/or transactions are processed.

The query engine(s) 103 may include any suitable query engine technology or combinations thereof. As examples, the query engine(s) 103 may include direct (e.g., SQL) execution engines (e.g., Presto SQL query engine, MySQL engine, SOQL execution engine, Apache® Phoenix® engine, etc.), a key-value datastore or NoSQL DB engines (e.g., DynamoDB® provided by Amazon.com®, MongoDB query framework provided by MongoDB Inc.®, Apache® Cassandra, Redis™ provided by Redis Labs®, etc.), MapReduce query engines (e.g., Apache® Hive™, Apache® Impala™ Apache® HAWQ™, IBM® Db2 Big SQL®, etc. for Apache® Hadoop® DB systems, etc.), relational DB (or "NewSQL") engines (e.g., InnoDB™ or MySQL Cluster™ developed by Oracle®, MyRocks™ developed by Facebook.com®, FaunaDB provided by Fauna Inc.), PostgreSQL DB engines (e.g., MicroKernel DB Engine and Relational DB Engine provided by Pervasive Software®), graph processing engines (e.g., GraphX of an Apache® Spark® engine, an Apache® Tez engine, Neo4J provided by Neo4j, Inc.™, etc.), pull (iteration pattern) query engines, push (visitor pattern) query engines, transactional DB engines, extensible query execution engines, package query language (PaQL) execution engines, LegoBase query execution engines, and/or some other query engine used to query some other type of DB system (such as any processing engine or execution technology discussed herein). In some implementations, the query engine(s) 103 may include or implement an in-memory caching system and/or an in-memory caching engine (e.g., memcached, Redis, etc.) to store frequently accessed data items in a main memory of the system 16 for later retrieval without additional access to the persistent data store.

Each DB can generally be viewed as a collection of objects, such as a set of logical tables, containing data fitted into predefined or customizable categories. As used herein, a "database object", "data object", or the like may refer to any representation of information in a DB that is in the form of an object or tuple, and may include variables, data structures, functions, methods, classes, DB records, DB fields, DB entities, associations between data and DB entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM DB can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM DB applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant DB system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Each application server 100 is also communicably coupled with one or more Order Management Systems (OMS) 3501-$y$ (where Y is a number; and collectively referred to as "OMSs 350" or "OMS 350"), which may also interact with the DBs 22 and 24. The OMS 350 acts as a central system for handling all the elements of an order, providing a global view of the order lifecycle. The OMS 350 also provides a master repository for storing order-related information and facilitating the use of analytics. OMS 350 functionality may include, for example, order integration; catalog management; inventory management; fulfillment and shipping; management of cancellations and returns; financial management (e.g., billing and payment); marketing and promotions; customer service; and business intelligence and reporting.

The OMS 350 may comprise one or more pools of servers, associated data storage devices, and/or other like computer devices dedicated to running/executing order management/processing and/or scheduling/queueing processes, procedures, etc. These servers may include the same or similar processor systems, memory systems, network interface, and other like components as the app servers 100 or other computer systems discussed herein. In some implementations, the OMS 350 may be a cloud-based system/ service and the servers may be or act as virtualization infrastructure. The virtualization infrastructure may comprise various hardware and software components and/or resources that are used to execute virtual or reconfigurable implementations of the OMS 350, as well as individual components and/or subsystems. The OMS 350 may be implemented via virtualization and/or user-level isolation. Virtualization may refer to the abstraction of one or more isolated VMs, which are virtual versions of computer hardware platforms, storage devices, and/or network resource(s) that are operated by a virtual machine monitor (VMM)

and/or hypervisor on shared computing resources. Each VM may operate one or more applications to perform various functions and/or provide various services to individual tenants and/or users. User-level isolation (also known as "containerization" or "operating system virtualization") may refer to the abstraction of multiple isolated tenant or user-space instances that may operate their own applications or services, run on a single host, and access a same OS kernel. Each tenant or user-space instance are virtualized and software-defined environments in which software applications can run in isolation of other software running on a physical host machine. The isolated user-space instances may be implemented using any suitable OS-level virtualization technology such as Docker® containers, Kubernetes® containers, Solaris® containers and/or zones, OpenVZ® virtual private servers, DragonFly BSD® virtual kernels and/or jails, chroot jails, sandboxes, and/or the like.

Figure 2A:
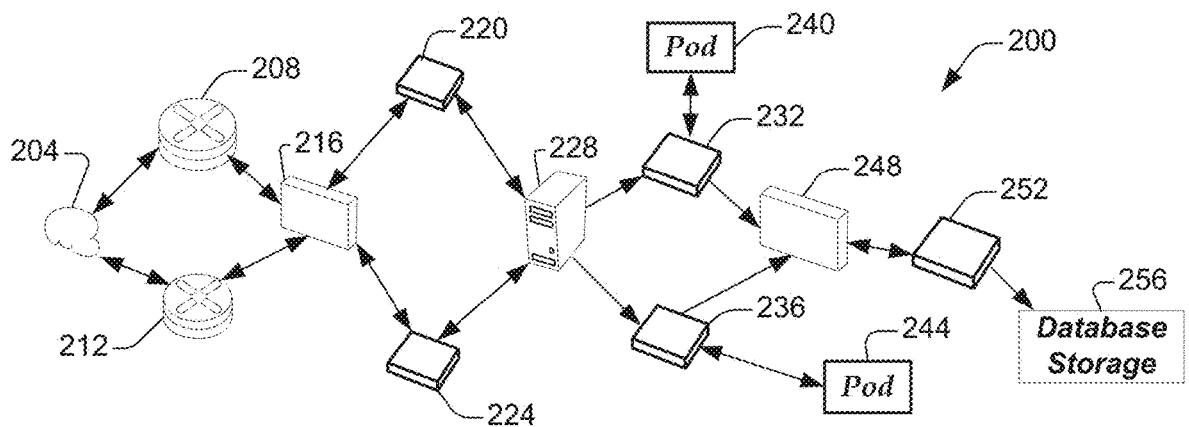
FIG. 2A shows example architecture of an on-demand database service environment according to various embodiments.

FIG. 2A shows a system diagram illustrating example architectural components of an on-demand DB service environment 200 according to some implementations. A client machine communicably connected with the cloud 204, generally referring to one or more networks in combination, as described herein, can communicate with the on-demand DB service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand DB service environment can communicate with DB storage 256 through a DB firewall 248 and a DB switch 252.

Figure 2B:
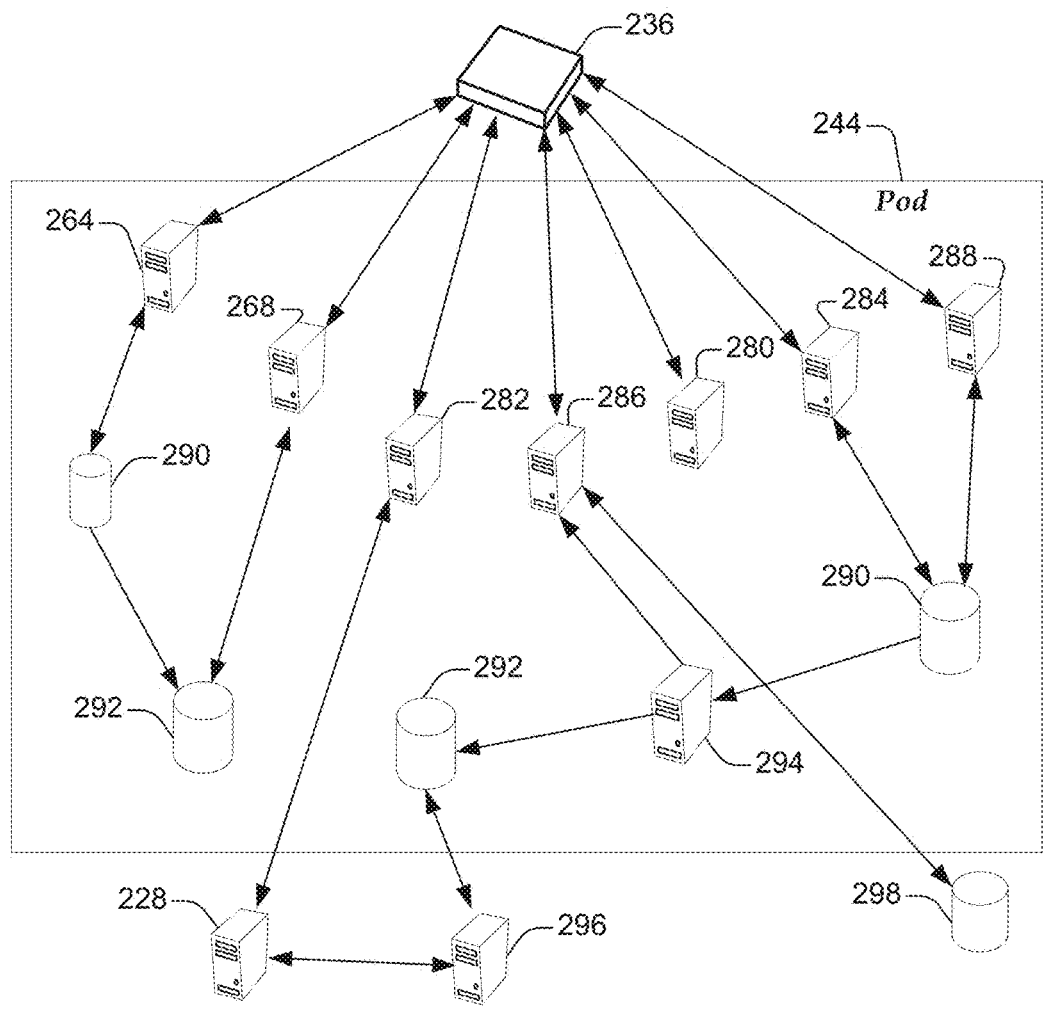
FIG. 2B shows example architectural components of the on-demand database service environment of FIG. 2A according to various embodiments.

As shown in FIGS. 2A and 2B, accessing an on-demand DB service environment can involve communications transmitted among a variety of different hardware or software components. Further, the on-demand DB service environment 200 is a simplified representation of an actual on-demand DB service environment. For example, while only one or two devices of each type are shown in FIGS. 2A and 2B, some implementations of an on-demand DB service environment can include anywhere from one to several devices of each type. Also, the on-demand DB service environment need not include each device shown in FIGS. 2A and 2B, or can include additional devices not shown in FIGS. 2A and 2B. One or more of the devices in the on-demand DB service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 refers to a data network or multiple data networks, often including the Internet. Client machines communicably connected with the cloud 204 can communicate with other components of the on-demand DB service environment 200 to access services provided by the on-demand DB service environment. For example, client machines can access the on-demand DB service environment to retrieve, store, edit, or process information. In some implementations, the edge routers 208 and 212 route packets between the cloud 204 and other components of the on-demand DB service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand DB service environment 200 from Internet traffic. In some embodiments, firewall 216 may be an active firewall. The firewall 216 can block, permit, or deny access to the inner components of the on-demand DB service environment 200 based upon a set of rules and other criteria (e.g., the policies 35 discussed previously). The firewall 216 can act as, or implement one or more of a packet filter, an application gateway, a stateful filter, a proxy server, virtual private networking (VPN), network access controller (NAC), host-based firewall, unified threat management (UTM) system, a Predictive Intelligence (PI) and/or FaaS, and/or any other type of firewall technology.

In some implementations, the core switches 220 and 224 are high-capacity switches that transfer packets within the on-demand DB service environment 200. The core switches 220 and 224 can be configured as network bridges that quickly route data between different components within the on-demand DB service environment. In some implementations, the use of two or more core switches 220 and 224 can provide redundancy or reduced latency.

In some implementations, the pods 240 and 244 perform the core data processing and service functions provided by the on-demand DB service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the DB storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the DB storage 256 is guarded by a DB firewall 248. In some implementations, the DB firewall 248 is an active firewall. Additionally, the firewall 248 may be equipped with the group optimization technologies discussed herein. The DB firewall 248 can act as a computer application firewall operating at the DB application layer of a protocol stack. The DB firewall 248 can protect the DB storage 256 from application attacks such as structure query language (SQL) injection, DB rootkits, and unauthorized information disclosure. In some implementations, the DB firewall 248 includes a host using one or more forms of reverse proxy services to proxy traffic before passing it to a gateway router. The DB firewall 248 can inspect the contents of DB traffic and block certain content or DB requests. The DB firewall 248 can work on the SQL application level atop the TCP/IP stack, managing applications' connection to the DB or SQL management interfaces as well as intercepting and enforcing packets traveling to or from a DB network or application interface.

In some implementations, communication with the DB storage 256 is conducted via the DB switch 252. The multi-tenant DB storage 256 can include more than one hardware or software components for handling DB queries. Accordingly, the DB switch 252 can direct DB queries transmitted by other components of the on-demand DB service environment (for example, the pods 240 and 244) to the correct components within the DB storage 256. In some implementations, the DB storage 256 is an on-demand DB system shared by many different organizations as described above with reference to FIGS. 1A and 1B.

FIG. 2B shows a system diagram further illustrating example architectural components of an on-demand DB service environment according to some implementations. The pod 244 can be used to render services to a user of the on-demand DB service environment 200. In some implementations, each pod includes a variety of servers or other systems. The pod 244 includes one or more content batch servers 264, content search servers 268, query servers 282, file (force) servers 286, access control system (ACS) servers 280, batch servers 284, and app servers 288. The pod 244 also can include DB instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (e.g., programs, routines, scripts, etc.) for supporting the construction of applications provided by the on-demand DB service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods. In various implementations, the app servers 288 may be the same or similar to the app servers 100 discussed with respect to FIGS. 1A-1B.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand DB service environment. The file servers 286 can manage requests for information stored in the file storage 298. The file storage 298 can store information such as documents, images, and basic large objects (BLOBs). By managing requests for information using the file force servers 286, the image footprint on the DB can be reduced. The query servers 282 can be used to retrieve information from one or more file systems. For example, the query system 282 can receive requests for information from the app servers 288 and transmit information queries to the NFS 296 located outside the pod.

The pod 244 can share a DB instance 290 configured as a multi-tenant environment in which different organizations share access to the same DB. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, a QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems (NFS) 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand DB service environment. The NFS 296 also can communicate with the QFS 292 to update the information stored on the NFS 296 or to provide information to the QFS 292 for use by servers located within the pod 244.

In some implementations, the pod includes one or more DB instances 290. The DB instance 290 can transmit information to the QFS 292. When information is transmitted to the QFS, it can be available for use by servers within the pod 244 without using an additional DB call. In some implementations, DB information is transmitted to the indexer 294. Indexer 294 can provide an index of information available in the DB 290 or QFS 292. The index information can be provided to file force servers 286 or the QFS 292.

II. Order API Embodiments

Figure 3:
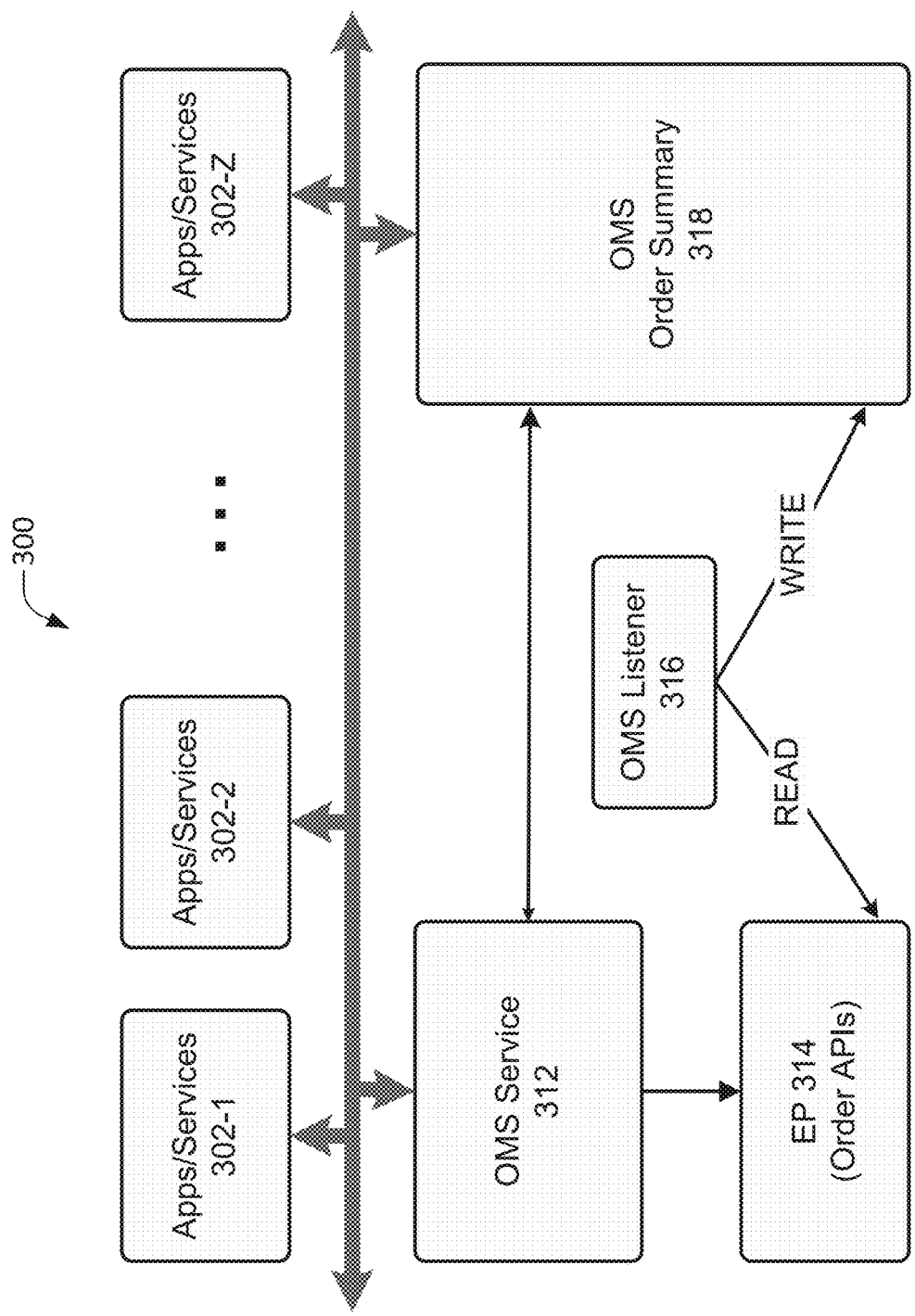
FIG. 3 illustrates an example order management architecture according to various embodiments.

FIG. 3 shows an example order management architecture 300 according to various embodiments. As shown, the order management architecture 300 includes OMS service 312, ecommerce platform (EP) 314, OMS listener 316, and OMS order summary (OMSOS) 318. Some or all of these entities may be implemented by the OMS 350 and/or other elements of the database system 16. In one example implementation, each of the OMS service 312, EP 314, OMS listener 316, and OMSOS 318 are implemented by the OMS 350. In another example implementation, the OMS service 312 is implemented by one or more app servers 100, and the EP 314, OMS listener 316, and OMSOS 318 are implemented by the OMS 350. Other arrangements are possible in other embodiments.

The order management architecture 300 also includes various applications and/or services 302-1 to 302-Z where Z is a number (collectively referred to as "apps/services 302" or the like). As examples, the apps/services 302 may include cloud services, storefront applications, PoS apps/services, WMS/ERP apps/services and the like. The apps/services 302 may be the CP apps developed/implemented by the CPs 50, which utilize the Order APIs discussed herein.

The OMS service 312 and/or the EP 314 handle the business logic needed to place, process, allocate, fulfill, cancel, return, and refund an order from apps/services 302. The OMS service 312 interacts with the various apps/services 302 and other entities within the OMS 350. The OMS service 312 may receive user requests from individual apps/services 302, request/query data or services from the EP 314 and/or the OMS Order Summary 318, and provide responses to the apps/services 302 based on the results of the requests/queries. The user requests may invoke or otherwise include Order API 32 calls to return aggregate statistics about various orders and/or to adjust various orders. The OMS service 312 interacts with the EP 314 to store order information in a standard way that any internal or external process can act upon. The OMS service 312 also interacts with the OMSOS 318 to validate orders that may be adjusted (e.g., reduced/cancelled or discounted).

The EP 314 implements the Order APIs 32. In response to invocation of one or more of the Order APIs 32, the EP 314 may access (e.g., read and/or write) data from the database system 16. The EP 314 may perform various actions depending on the type and content of a request received from apps/services 302 via the OMS service 312. When a request invokes the Order Retrieve API 32, the EP 314 queries the database system 16 (see e.g., FIGS. 1A-2B) to retrieve the current state of one or more orders, retrieve a summarized state of one or more orders as of a specified date, and retrieve potential state(s) of one or more orders according to one or more specified changes. In the latter case, the EP 314 may calculate the potential state(s) of the order(s) based on the specified change(s), and return those potential state(s) to the app/services 302 via the OMS service 312.

When a request invokes the Order Change API 32, the EP 314 may execute business logic to process order line item changes and/or quantity changes to one or more existing orders. The line item changes may include, for example, applying discounts to a total price of an order, applying taxes to an order, shipping cost changes, and/or the like. The quantity changes may include, for example, order item reductions, order cancellations, order item increases, and the like. The business logic in the EP 314 processes order line item changes, for example, by identifying items that are eligible to be cancelled based on a fulfillment status of the order, determining if shipping costs should be adjusted or cancelled, determining if discounts should be applied or cancelled, determining if the order is eligible for price changes including increases or decreases, and computing order lines, taxes, and adjustment prices. In some embodiments, the EP 314 may be made aware of order quantity changes are made to an order item pre- or post-fulfillment since this may impact how the change order is processed.

In various embodiments, the tenant DB 22 (see e.g., FIG. 1B) may comprise one or more data storage devices that act as a repository for persistently storing and managing collections of data according to a predefined database structure. The datastores used to implement the tenant DB 22 may be distributed datastores comprising a network of data storage devices. In these embodiments, the tenant DB 22 may be configured to store order objects. The order objects are database objects (DBOs) that contain a CP's 50 order-related data. In the context of order objects, an "object" is an element in which data or information can be stored, where the object is the overall definition of the type of information being stored. As used herein, a "database object" or "DBO" refers to any representation of information in a database that is in the form of an object or tuple, and may include one or more of variables, data structures, functions, methods, classes, records, fields, data items, associations between data and database entities (also referred to as a "relation"), and the like. The term "record" describes a particular occurrence of an object, such as a specific order that is represented by an order object; a record is analogous to a row in a database table. In some embodiments, the tenant DB 22 may employ a relational database structure that includes multiple database objects. In these embodiments, the order objects may be represented as "sObjects." An sObject is a variable that represents a row of data and can be declared using the API 32 name of the object. The names of sObjects correspond to the API names of the corresponding objects (e.g., order objects), and the names of sObject fields correspond to the API names of the corresponding fields. In various implementations, sObjects may be database objects that are accessible and writable using the query language used by the user system 12 (e.g., SQL, SOQL, or the like). Example implementations of such datastores include the Force.com platform provided by Salesforce®.com®, Oracle® Database 12c, IBM® DB2, Microsoft® ACCESS®, and/or the like. In some embodiments, the Order API 32 includes a change order detail, which is not exposed as an order sObject.

OMS listener 316 is an interface that handles order-related events. The OMS listener 316 may be a method or function that is called when a change or update to an order takes place. The OMS listenser 316 retrieves summarization of the order with the selected changes from the EP 314 and persists those changes in the OMSOS 318. The OMS listener 316 reads the changes made by th EP 314 as events, and notifies (writes) the OMS Order Summary 318 of the changes/updates. In this regard, the OMS listener 316 may pass event parameters that indicate each detected event. In one example, the OMS listener 316 may detect when the EP 314 access data from the database system 16, and may pass one or more relevant parameters to the OMSOS 318 so that the necessary changes are reflected in the order summary to be provided to the apps/services 302. In another example, the OMS listener 316 may detect that a particular action or transaction was omitted when the EP 314 accessed data from the database system 16, and may pass one or more relevant parameters to the OMSOS 318 so that the necessary changes are reflected in the order summary to be provided to the apps/services 302.

The OMSOS 318 is a service entity that generates and provides a summary view of an order lifecycle including status/state of an order, fulfillment, shipping, payment, billing, etc. The OMSOS 318 also tracks changes to orders and generates order summaries based on the tracked changes. In embodiments, the OMSOS 318 provides a preview of selected changes to an order prior to those changes being completed. In some embodiments, a publish/subscribe model may be used to implement the OMSOS 318, where certain OMS 350 entities and/or apps/services 302 subscribe to the OMSOS 318, and when a change to an order takes place, the OMSOS 318 provides order summaries to the subscribing entities.

Embodiments include an Order API 32 that abstract the complexity of the underlying EP 314 and associated data model (e.g., data model 400 of FIG. 4) while still enforcing business rules. The Order API 32 includes a Order Change API and a Order Retrieve API (which are collectively referred to herein as "Order API" or "Order API 32"). A change order is a collection of modifications to an original order after activation of the original order. The underlying implementation of the Change Order can be very complex, for example, a change line can be represented as a delta line, an offset line, or a supersede line based on some financial rules or constraints.

A change order may include line level adjustments to an order item/product and quantity adjustments to an order item/product. The quantity adjustments include increasing the quantity of an order item/product pre- or post-fulfillment, reducing the quantity of an order item/product pre-fulfillment (referred to as a "cancel order" or "cancel"), and reducing the quantity of an order post-fulfillment (referred to as a "return order" or "return"). The line level adjustments adjustments include increasing or decreasing the cost or price of orders or individual order items/products. For example, the line level adjustments adjustments may include applying discounts to orders post-order creation pre-fulfillment or post-fulfillment. The discounts may include, for example, discounts to the total price, discounts to order items, and discounts to delivery costs.

The Order Retrieve API enables viewing of orders and its related custom objects and/or financial records (e.g., product details, adjustments, taxes, etc.) with selected changes applied. The Order Retrieve API can be used to retrieve the current state of an order; retrieve the summarized state of an Order as of a specified date; and retrieve a potential state of an order (along with its changes). The Order Change API allows users to view the current status of one or more orders with one or more applied changes (e.g., the aforementioned discounts, reduced quantities, etc.) without applying those changes to the underlying data of the orders. The Order API 32 allows users to view how selected changes would affect the order before committing the transaction to update the order, which over time, reduces the number of transactions submitted to the system 16. In this context, the users may include, for example, developers/programmers associated with the CP 50, personnel such as auditors or accountants associated with the CP 50, users of the CP 50 such as ecommerce consumers, and the like). In one example, an accountant user may need to view state of an Order and all of its changes made as of a certain date. Since the order and related data model (see e.g., FIG. 4) contains sensitive financial information, accountants may not have access to details of the changes, and even elements such as the counts of instances of the changes (a particular item is being returned frequently). Using the Order Retrieve API, the accountant can still have all the information summarized across the original Order and all the applicable changes.

Furthermore, in order to obtain information about an order and all of its changes, users may use the Order API 32 to query for all of this data. In embodiments, such a query would include at a minimum: a query to return the order and its child entities, such as Order Products, Adjustments, Taxes etc., and/or a query to return Change Orders having a RelatedOrder field pointing to the original Order and their child entities mentioned previously.

The API calls defined by the Order API 32 are summarized by table 1, which indicates example request and response message bodies for each listed API call.

TABLE 1

Order API

| Type | Method | API Call | Request/Response Example |
| --- | --- | --- | --- |
| Change Order Status | POST | /commerce/orders/{orderId}/actions/changeStatus | Table 2 |
| Header Level Adjustment | POST | /commerce/orders/{orderId}/actions/adjust | Table 3 |
| Change Order Item Quantity | POST | /commerce/orders/{orderId}/lineItems/{orderItemId}/actions/changeQuantity | Table 4 |
| Adjust Order Item | POST | /commerce/orders/{orderId}/lineItems/{orderItemId}/actions/adjust | Table 5 |
| Header Level Changes | GET | /commerce/orders/{orderId}/changes | Table 6 |
| Change Order Detail | GET | /commerce/orders/{orderId}/changes/{changeOrderId} | Table 7 |
| Retrieve Order | GET | /commerce/orders/{orderId}?expand=?&viewType=? | n/a |

TABLE 2 example Change Order Status request and response

```
Request: {
    status: "Activated"
}
Response: {
    statusCode: 200
    body: {
        "orderId": "801x00000000010"
    }
}
```

TABLE 3 example Add Header Level Adjustment Distributions request and response

```
Request: {
    distributions: [{
        relatedOrderItemId: "802x00000000001",
        amount: −20,
        taxes: [{
            relatedTaxLineId: "0aux00000000001",
            amount: −0.2,
            type: "Estimated"
        }]
    }]
}
Response: {
    statusCode: {statusCode}
    body: {
        "changeOrderId": "801x00000000010"
    }
}
```

TABLE 4 example Change Order Item Quantity request and response

```
Request: {
        quantity: -3,              // the quantity changed
        adjustmentLineItems: [{
            relatedAdjustmentLineItemId: "3qZx00000000001",
            amount: 15             // the amount to be offset
        }]
        taxLineItems: [{
            relatedTaxLineItemId: "0aux00000000001",
            amount: -1.2           // the amount to be offset
        }]
}
Response: {
        statusCode: {statusCode}
        body: {
            "orderId": "801x00000000011"
        }
}
```

TABLE 5 example Add Adjustments to Order Item request and response

```
Request: {
        changeOrderId: "801x00000000011"
        adjustmentLineItems: [{
            amount: -10,
            taxLineItems: [{
                amount: -0.11,
                type: "Estimated"
            }]
        }]
}
Response: {
        statusCode: {statusCode}
        body: {
            "orderId": "801x00000000010"
        }
}
```

TABLE 6 example Header Level Changes request and response

```
Request: {
        OrderId: "801x00000000001"
}
Response: {
        statusCode: {statusCode}
        body: {
            <!--list of Change Order Details--!>
        }
}
```

TABLE 7 example Change Order Detail request and response

```
Request {
        changeOrderId "801x00000000011"
}
Response: {
        statusCode: {statusCode}
        body: {
            <!--Change Order Detail--!>
        }
}
```

In the example of table 2, the client app 12y and/or app/service 302 performs an HTTP POST method using the listed Universal Resource Indicator (URI) where the orderId is the order identifier (ID) associated with the order object.

Table 8 also shows the request and response that is to be sent in mark-up language format. In some embodiments, the request parameters may be appended to the URI in the POST (e.g., after the "changeStatus" in table 2). The request includes a status field/data element including a value of "Activated". The response includes a statusCode field/data element including a value of "200" (e.g., indicating "OK") and a body field with an orderId data element including an ID of the order object. In other embodiments, the request and/or response may include a standard platform event, which is the same or similar to the standard platform event shown by table 10 infra.

Additionally, as shown by table 1, the Order Retrieve API call (e.g., "/commerce/orders/{orderId}?expand=?& viewType=?") includes two query parameters including "expand" and "viewType". When the expand query parameter is not specified, only the header level information is returned. When the expand query parameter is specified, the children records are returned. When the viewType is not specified only the original order would be returned. When the viewType is specified, the original order and the active changes summarized are returned (IncludeChanges), the original order and the all changes summarized are returned (IncludePendingChanges), and/or the original order and the all changes as of date are returned (AsOfDate).

Figure 4:
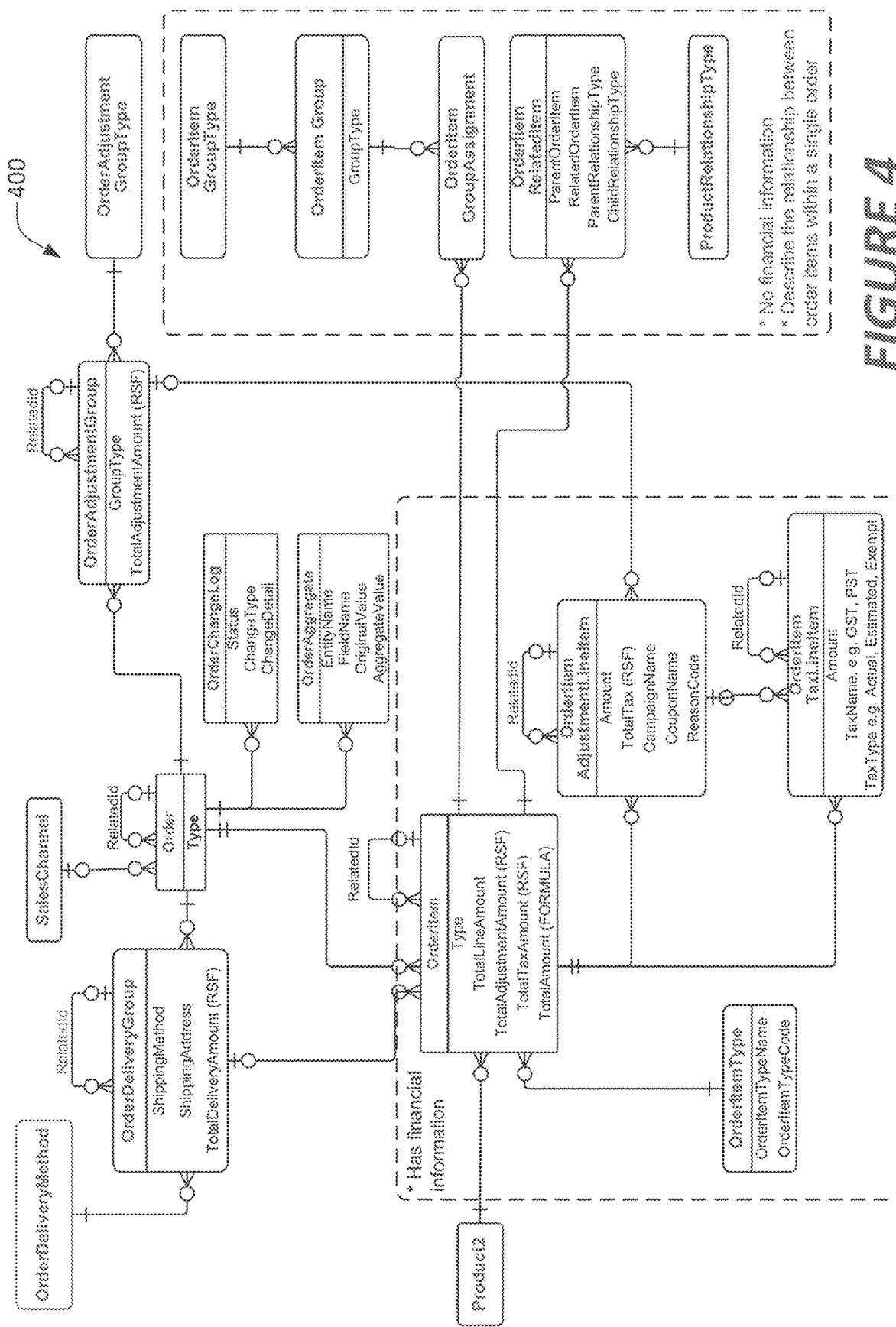
FIG. 4 shows an example data model for practicing various embodiments discussed herein.

FIG. 4 shows an example entity relationship model (ERM) 400 for carrying out various embodiments discussed herein. The ERM 400 is a graphical representation of database entities and their relationships to one another. In FIG. 4, a box represents an entity, which is an object to be tracked in the database and that may collect and store multiple instances of data. An entity is shown with two compartments. The top compartment indicates the entity name or label, and the bottom compartment holds a list of attributes. An "attribute" is a a property or trait, which may describe the data stored by the entity. The entity name may correspond to a record or row in a database and each listed attribute may correspond to a field or column in the database. A relationship between two entities is shown by a line between the two entities. The relationship illustrates an association between two entities, and each relationship includes a cardinality and a modality. Cardinality refers to the maximum number of times an instance in one entity can be associated with instances in the related entity. Modality refers to the minimum number of times an instance in one entity can be associated with an instance in the related entity. The type of relationship is depicted using different symbols or notations at each end of the line. In FIG. 4, a ring or cirle represents zero, a perpendicular line or dash represents one, and a crow's foot symbol (with three toes) represents many or infinate. These symbols are used in pairs to represent the four types of cardinality that an entity may have in a relationship, where the inner component of the notation represents the minimum and the outer component represents the maximum. For example, a circle and a dash represents a minimum of zero and a maximum of one (optional); two dashes represents a minimum of one and a maximum of one (mandatory); a circle and a crow's foot represents a minimum of zero and a maximum of many (optional), and a dash and a crow's foot represents a minimum of one and a maximum of many (mandatory).

Referring now to FIG. 4, the Product2 entity represents a product object, which has several fields that are used for quantity and revenue schedules (e.g., annuities). The OrderItem entity represents an order product (e.g., Product2) that an organization sells, such as a line item of an order. The OrderItem entity includes the following attributes: type, TotalLineAmount, TotalAdjustmentAmount (RSF), TotalTaxAmount (RSF), and TotalAmount (FORMULA). The OrderItem entity may or may not have a financial impact, depends on the billing rule and tax rule associated with the line.

The OrderItemType entity (enumeration) represents an item that a customer/user purchases (e.g., a product or service). The OrderItemType may be an Order Product (Product), a Bundle Item (Product) which represents an item within a bundled product, or a Delivery Charge (Charge) which represents an order delivery charge. The OrderItemType entity includes an OrderItemTypeName and OrderItemTypeCode attributes. OrderItemTypeCode represents a Product or Charge. A Product order item is generally fulfillable. A Charge order item represents an extra charge/fee that is added as part of the ordering process. The Charge order item is generally not fulfillable. Examples of such order items include a gym membership initiation fee, a provisioning fee, a delivery charge, or the like.

The OrderItem AdjustmentLineItem entity explains the reason how a total product price is arrived at, which is different from the unit price. Order level price adjustment may need be distributed to the order item level. The OrderItem AdjustmentLineItem entity includes the following attributes: Amount, TotalTax (RSF), CampaignName, CouponName, and ReasonCode. In some embodiments, ReasonCode are configurable per change type. The OrderItem TaxLineItem entity represents the tax liability that the associated order product is incurrs. The TaxLineItem would be linked to the associated PriceAdjustment as a result of an adjustment.

The OrderChangeLog entity represents a log of order changes, and includes the following attributes: Status, ChangeType, and ChangeDetail. The ChangeType attribute includes a Quantity (Qty) Change, a new adjustment, an address change, and/or other like elements.

The OrderAdjustmentGroupType entity (enumeration) includes a Header and/or a Split Line. The Header is an order header level adjustment, which may or may not apply to all lines. The Split Line may be based on a price-breakdown, partial shipping, etc.

The OrderItemGroupType entity (enumeration) may be or include a Price Break-Down Group, a Must Be Shipped Together Group, a Coupon Group; a (CPQ) MDQ, or a (CPQ) Quote Group (not shown by FIG. 4).

OrderItemGroupAssignment is also known as OrderItemRelatedItem, and indicates product relationships. The ProductRelationshipType entity (enumeration) may be or include a BundledWith and/or BundleItem, HasOption and/or OptionFor; (CPQ) CoveredBy and/or Covering (e.g., PoT) (not shown by FIG. 4). A delivery group cannot be expressed in the generic OrderItemGroup since the platform doesn't support roll-up through a junction object.

Figure 17:
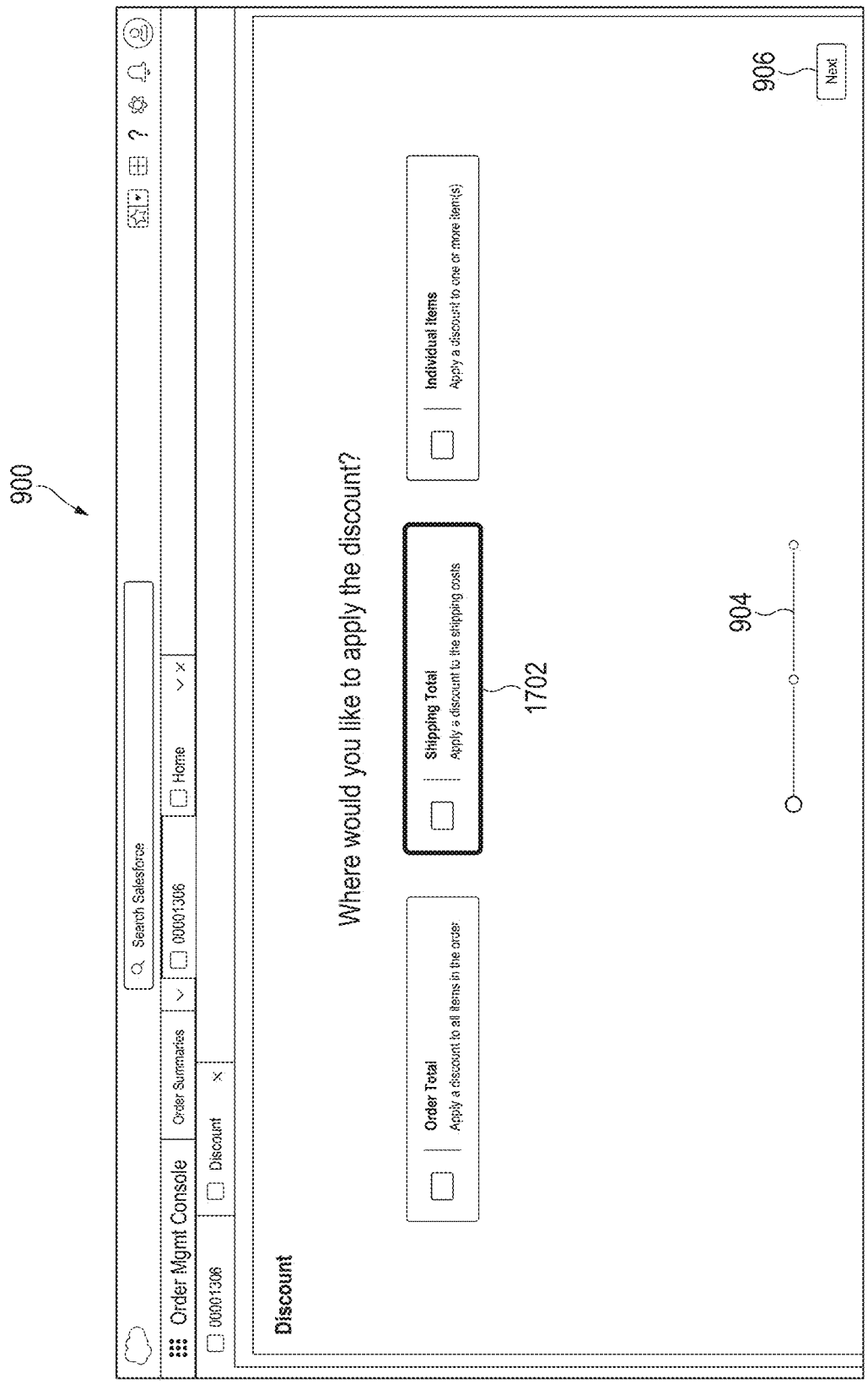
Figure 18:
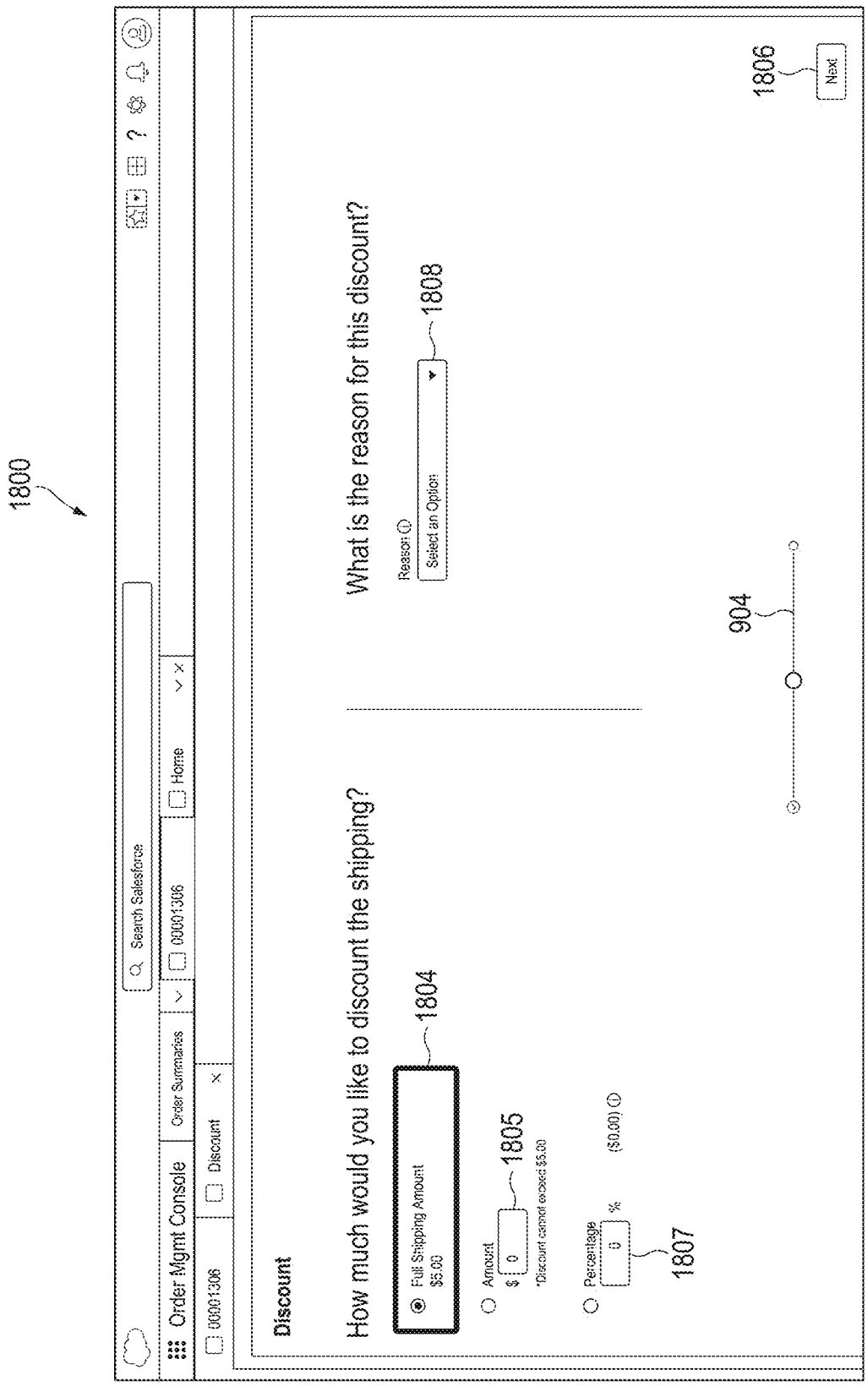

FIGS. 5-19 illustrate various example graphical user interfaces (GUIs) implementing the Order APIs according to various embodiments discussed herein. In particular, FIGS. 5-8 show various instances of an example GUI at various stages of cancelling or reducing an active order; FIGS. 9-12 show various instances of an example GUI at various stages of applying a discount to an order total; FIGS. 13-16 show various instances of an example GUI at various stages of applying a discount to an individual items; and FIGS. 17-19 show various instances of an example GUI at various stages of applying a discount to shipping costs. Each of FIGS. 5-19 illustrate example interfaces that may be displayed on a user system 12 (such as the various GUIs and GCEs discussed previously). The example GUIs may be displayed or rendered by a dedicated application implemented by the user system 12 or rendered within a web browser implemented by the user system 12. While particular example GUIs are illustrated, in various embodiments, other interfaces may be utilized. Additionally, while the examples of FIGS. 5-19 may be generated by program code/modules of the user system 12, in other embodiments, the GUIs may be generated, in whole or in part, by program code/modules at the system 16 and provided to the user system 12 via the communications system 12E for rendering (e.g., one or more web pages rendered in a browser or client app 12$y$ operated by the user system 12).

Figure 5:
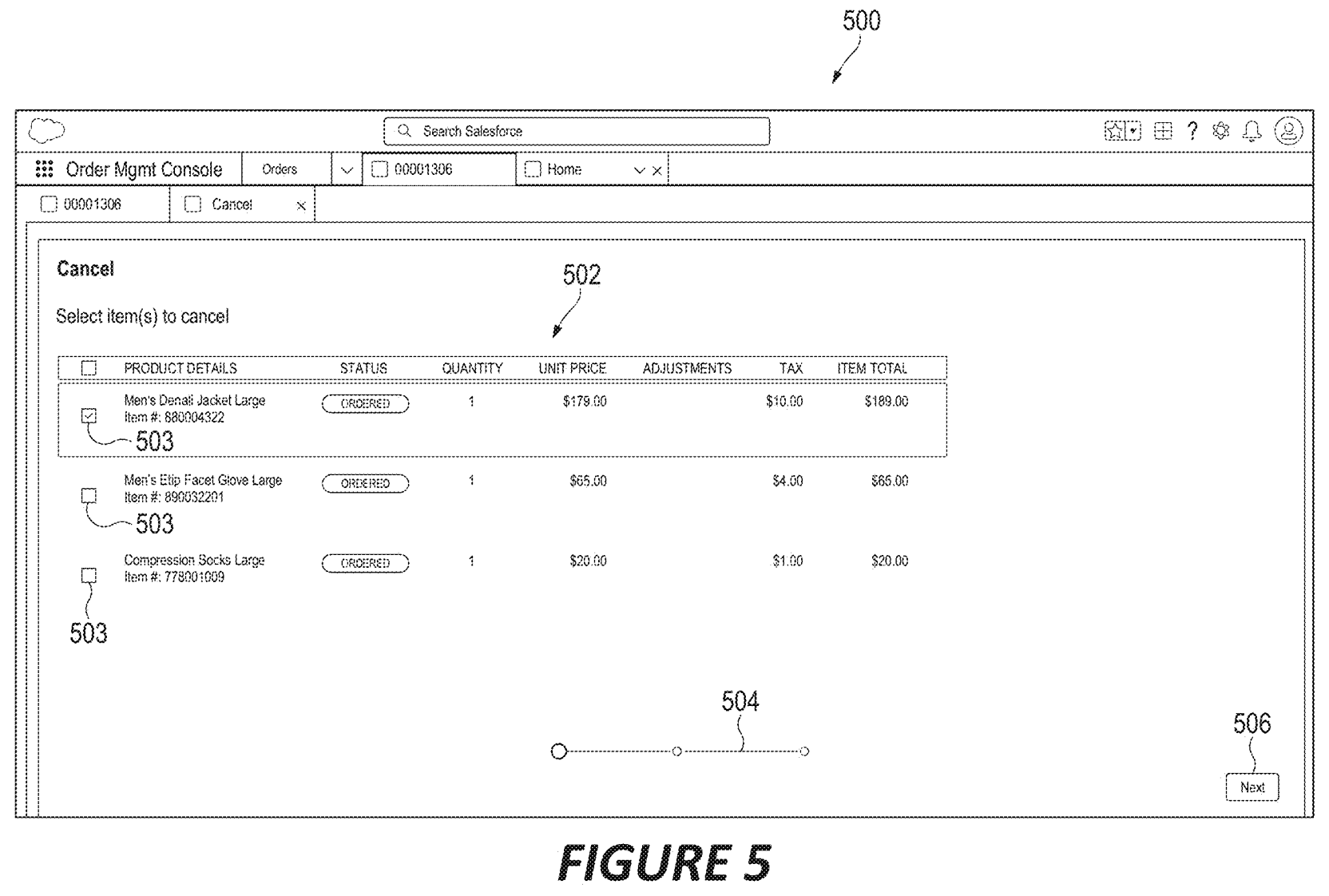

FIGS. 5-8 show example instances of GUI at various stages of cancelling or reducing an active order. Referring now to FIG. 5, which shows an GUI instance 500 for selecting one or more items to be reduced or cancelled. As shown by FIG. 5, the GUI instance 500 includes a database object (DBO) (e.g., a table) graphical object 502, which graphically represents an order object. The DBO graphical object 502 includes multiple records, each of which corresponds to an item in the order object. The DBO graphical object 502 also includes graphical control elements (GCEs) 503, each of which corresponds to an item in the order, including a selected GCE 503. The fields in the order object include a product detail field, a status field, a quantity field, a unit price field, an adjustments field, a tax field, and an item total field. In this example, the user has selected the GCE 503 corresponding to the "Men's Denali Jacket Large Item #: 880004322" product detail (where the selected GCE 503 includes a check mark, and the corresponding record in the DBO graphical object 502 is highlighted). The GUI instance 500 also includes a graphical object 504 that indicates a stage in the item reduction/cancellation process. After selecting the item(s) to be cancelled or reduced, the user may proceed to the next stage in the reduction/cancellation process by selecting the GCE 506 (e.g., the "Next" button in FIG. 5).

Figure 6:
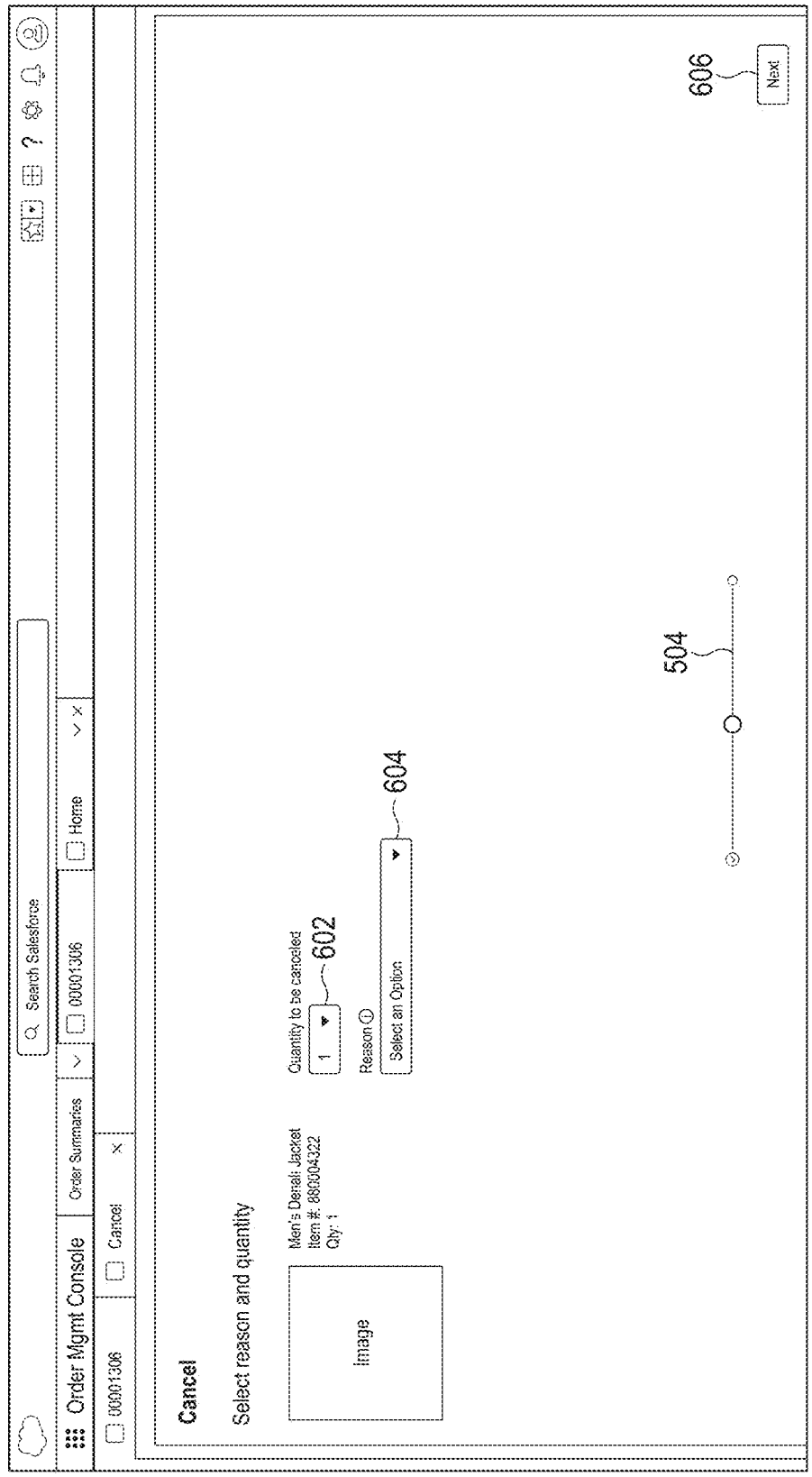

FIG. 6 shows an GUI instance 600 for selecting a quantity to be reduced and reasons for the reduction/cancellation according to various embodiments. GUI instance 600 includes a GCE 602 that allows the user to select the quantity to be cancelled. In this example, the GCE 602 is a drop down list that is prepopulated with different quantities to reduce the selected item, where selected a value in the drop down list equal to the number of items in the order cancels the order. GUI instance 600 also includes a GCE 604 that allows the user to select or otherwise input a reason for the quantity reduction or cancelation. In this example, the GCE 604 is a drop down list that is prepopulated with a list of predefined reasons for cancelling or reducing the item amount. In other embodiments, other GCEs may be used, for example, a text box may be included to allow the user to type the reason for the reduction/cancellation. After selecting the quantity to be reduced and the reason for the cancellation/reduction, the user may proceed to the next stage in the reduction/cancellation process by selecting the GCE 606. Upon selecting the GCE 606 (e.g., the "Next" button in FIG. 6), the client app 12$y$ (see e.g., FIG. 1A) and/or app/service 302 (see e.g., FIG. 3) may make the API call shown by table 8.

TABLE 8

```
POST  /commerce/orders/{orderId}/lineItems/{orderItemId}/
actions/changeQuantity
Request:
{
    Quantity: -1,
    Taxes: [{
        OriginalTax: "0aux00000000001"
        Amount: -10.00,
        Type: "Estimated"
    }],
    Reason: "Found cheaper price somewhere else"
}
Response: {
    ChangeOrderId: "801x00000000010"
}
```

In the example of table 8, the client app 12*y* and/or app/service 302 performs an HTTP POST method using the listed Universal Resource Indicator (URI) where the orderId is the order identifier (ID) associated with the order, and the orderItemId is an identifier associated with the selected item. Table 8 also shows the request that is to be sent in mark-up language (e.g., JSON) format. In this example, the client app 12*y* and/or app/service 302 passes a delta amount to the OMS 350 (e.g., to the EP 314 via the OMS service 312 of FIG. 3). Here, the delta amount is the amount to be changed to the order item. Additionally, the client is responsible to offset all the associated adjustment and tax line items against the original line items. The request includes a quantity field/data element, a taxes field, and a reasons field/data element. Additionally, the taxes field includes an OriginalTax data element, an Amount data element, and a type data element. In this example, the quantity field/data element has a value of −1, the reasons data element includes a value of "Found cheaper price somewhere else", the OriginalTax data element has a value of "0aux00000000001", the Amount data element has a value of −10.00, and the type data element has a value of "Estimated". In some embodiments, the request parameters may be appended to the URI in the POST (e.g., after the "changeQuantity" in table 8). Table 8 also shows the response that is provided to the client app 12*y* and/or app/service 302 in mark-up language (e.g., JSON) format. The response includes a ChangeOrderId field including a change order ID (e.g., a value of "801x00000000010" in table 8).

Figure 7:
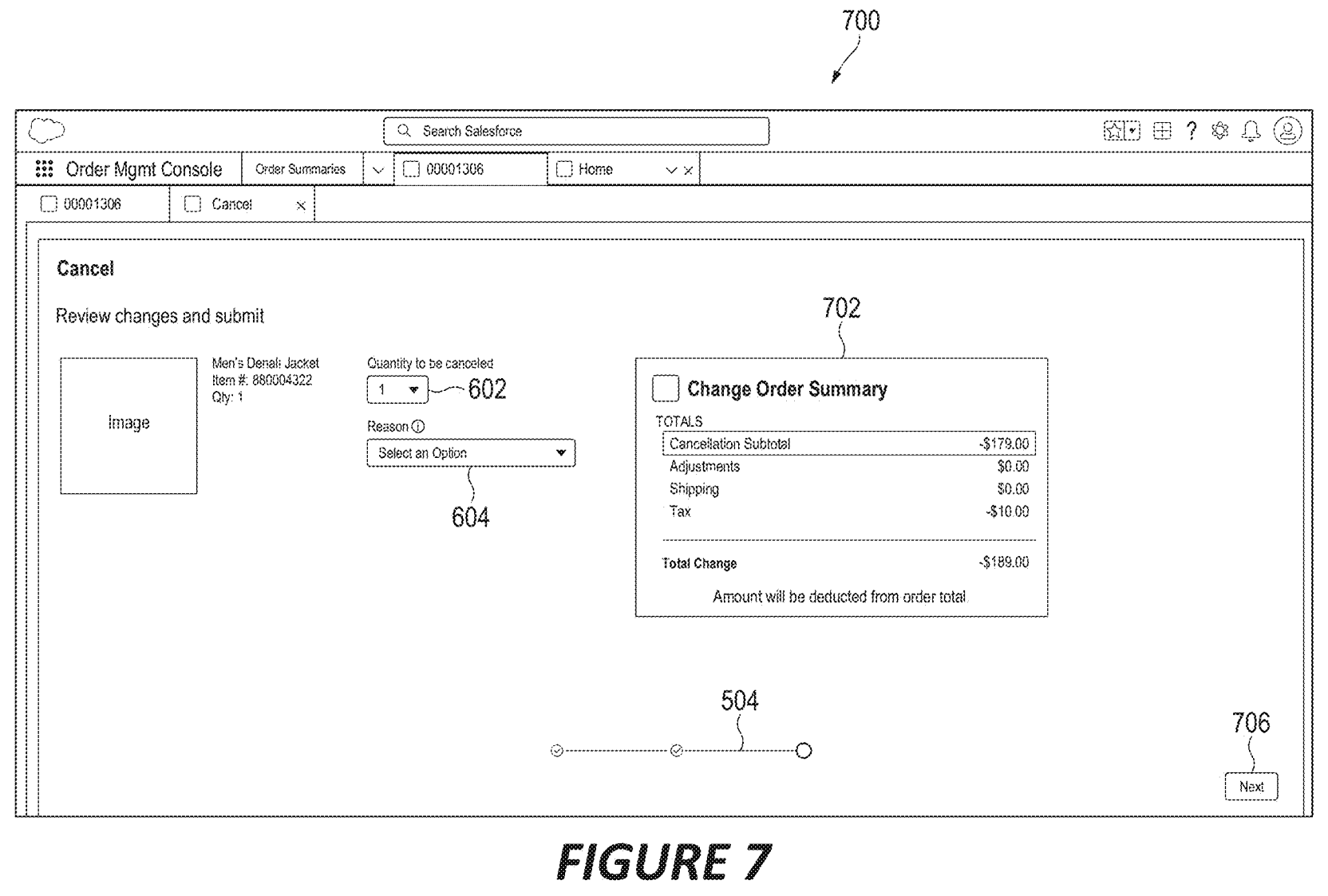

FIG. 7 shows an GUI instance 700 to preview a change order summary according to various embodiments. GUI instance 700 includes a change order summary graphical object 702 indicating the state of the order with the changes selected using GUI instances 500-600. Rendering the GUI instance 700 (e.g., by selecting the Next button 606 in FIG. 6) may cause program code (e.g., a script) to be executed, which may cause the API call shown by table 9 to be made.

TABLE 9

```
GET  /commerce/orders/{changeOrderId}
Response: {
    OriginalOrderId: "801x00000000001",
    TotalAmount: -179.00,
    TotalProductAmount: -179.00,
    TotalAdjustmentAmount: 0.00,
    TotalDeliveryAmount: 0.00,
    TotalTaxAmount: -10.00,
    TotalProductTaxAmount: -10.00,
    TotalAdjustmentTaxAmount: 0.00,
    TotalDeliveryTaxAmount: 0.00,
    GrandTotalAmount: -189.00
}
```

In the example of table 9, the client app 12*y* and/or app/service 302 performs an HTTP GET method using the listed URI where the changeOrderId is the change order ID obtained after submitting the changes (e.g., "801x00000000010" from table 8). This allows fewer parameters to be passed to the EP 314, which may reduce computing/networking resource overhead. The GET method on the ChangeOrderId returns header information for a given change order (e.g., the response message in table 9). Table 9 also shows the response that is provided to the client app 12*y* and/or app/service 302 in mark-up language (e.g., JSON) format. The response includes an OriginalOrderId field including the order ID (e.g., "801x00000000001") of the order, and various other fields as shown by table 9 indicating the changed values of the changed order. After previewing the change order summary 702, the user may commit the changes by selecting the GCE 706 (e.g., the submit button in FIG. 7). Upon selecting the GCE 706, the client app 12*y* and/or app/service 302 may make the API call shown by table 10.

TABLE 10

```
POST  /commerce/orders/{changeOrderId}/actions/activate
Standard Platform Event: Change Order Status Change Body: {
    OrderId: "801x00000000010",
    OriginalOrderId: "801x00000000001",
    OldStatusCode: "Draft",
    NewStatusCode: "Activated"
}
```

In the example of table 10, the client app 12*y* and/or app/service 302 performs an HTTP POST method using the listed URI where the changeOrderId is the change order ID associated with the previously submitted change order (e.g., "801x00000000010" from table 8). The request is a standard platform event with a change order status body that includes an OrderId field including the change order ID associated with the previously submitted change order (e.g., "801x00000000010" from table 8), the OriginalOrderId field including the order ID of the original order (e.g., "801x00000000001"), an OldStatusCode field, and a NewStatusCode field. The OldStatusCode field includes the value "Draft" since the change order was not made permanent, and the NewStatusCode field includes the value "Activated" to commit the changes to the order. In some embodiments, when a user decides to abandon the reduce quantity change prior to submitting a change order, the EP 314 determines if the change order that were created in "draft" should be deleted.

Figure 8:
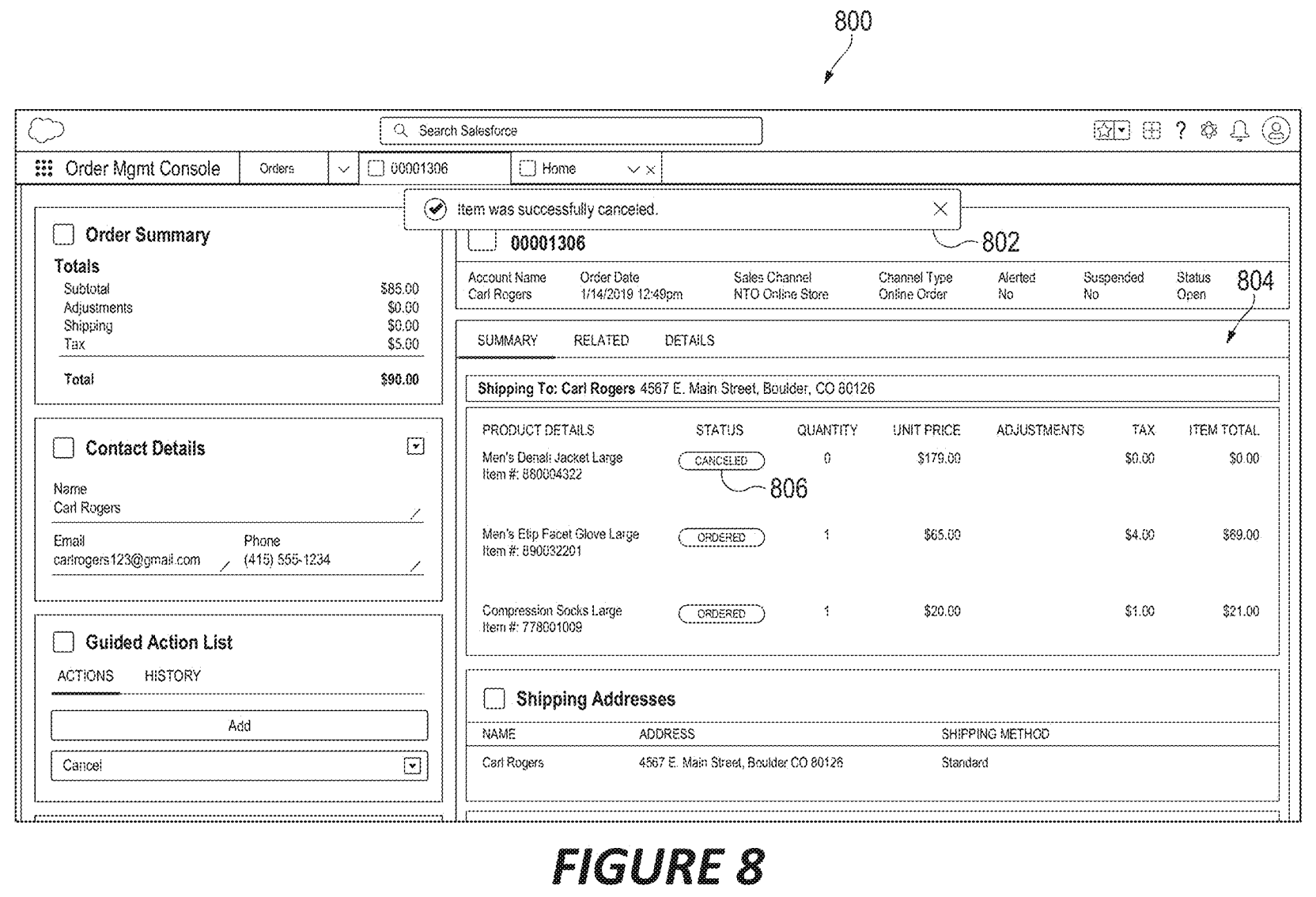

FIG. 8 shows an GUI instance 800 showing an updated order summary according to various embodiments. GUI instance 800 is an order dashboard that includes various panels indicating information for various orders, and also includes graphical object 802 indicating that the item was successfully cancelled. A summary panel 804 of the changed order includes a graphical object 806 indicating the changed state of the order (e.g., "CANCELED"). Rendering the GUI instance 800 may cause program code (e.g., a script) to be executed, which causes an Order Activated event to take place. When the Order Activated event takes place, the API call shown by table 11 to be made.

TABLE 11

| GET /commerce/orders/{orderId}?expand=... &viewType=IncludeChanges |
| --- |

In the example of table 11, the client app 12*y* and/or app/service 302 performs an HTTP GET method using the listed URI where the orderId is the order ID of the order, and includes a parameter to include the updated changes to the order (e.g. "&viewType=IncludeChanges"). Additionally, the response to the GET method may include an order representation data element, which may indicate how the summary panel 804 is to be arranged and/or rendered.

Figure 9:
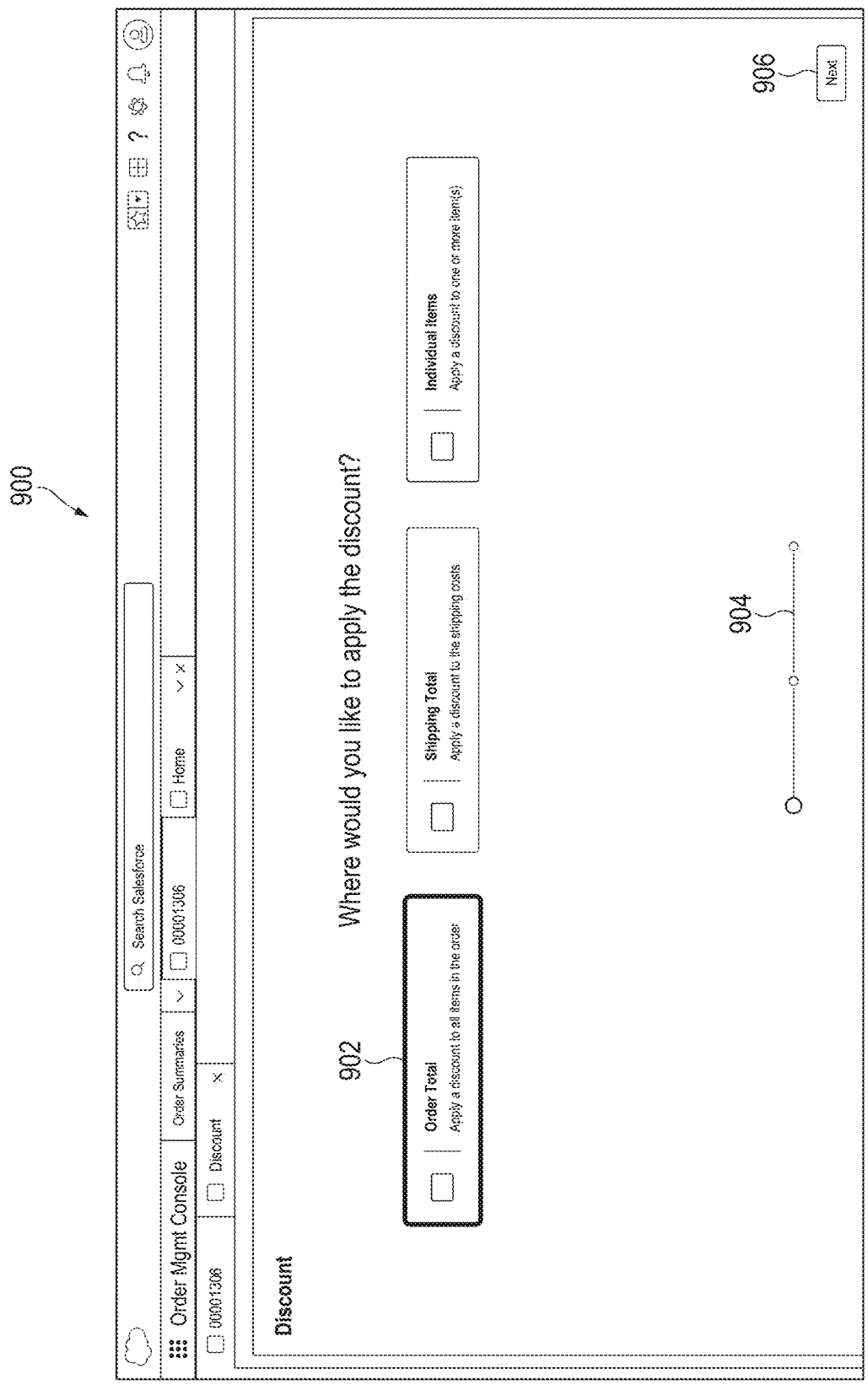

FIGS. 9-12 show example instances of GUI at various stages of applying a discount to an order post-creation, according to various embodiments. Referring now to FIG. 9, which shows an GUI instance 900 for selecting a discount to be applied to an order. The GUI instance 900 shows GCEs corresponding to different discounts that may be applied to an existing order. In this example, the user has selected the GCE 902 corresponding to the "Order Total" discount option. The GUI instance 900 also includes a graphical object 904 that indicates a stage in the line item change process. After selecting the discount option to be applied, the user may proceed to the next stage in the line item change process by selecting the GCE 906 (e.g., the "Next" button).

Figure 10:
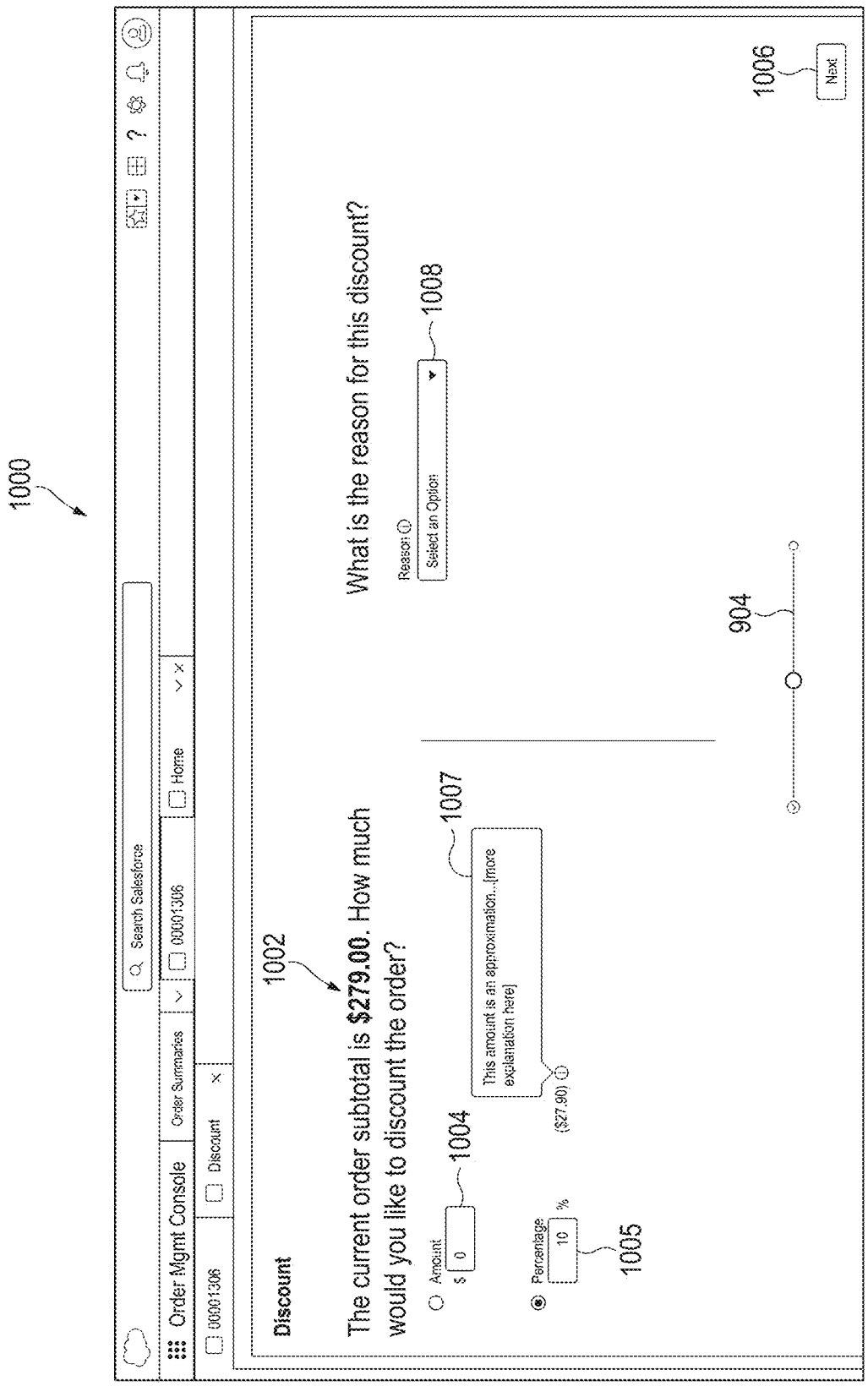

FIG. 10 shows an GUI instance 1000 for selecting an order total discount according to various embodiments. GUI instance 1000 includes a graphical object 1002 indicating the current total order amount (e.g., "$279.00" in FIG. 10). The GUI instance 1000 also includes a GCE 1004 (e.g., a text box) which allows the user to enter a discount amount to be applied to the order total, a GCE 1005 (e.g., a text box) which allows the user to enter a discount percentage to be applied to the order total, and a graphical object 1007 indicating the amount to be discounted based on the inputted percentage (e.g., "$27.90" in FIG. 10 based on the value "10%" entered into the text box 1005). GUI instance 1000 also includes a GCE 1008 that allows the user to select or otherwise input a reason for the discount. In this example, the GCE 1008 is a drop down list that is prepopulated with a list of predefined reasons for applying the discount. In other embodiments, other GCEs may be used, for example, a text box may be included to allow the user to type the reason for the order total discount. After selecting the discount amount and the reason for the order total discount, the user may proceed to the next stage in the order total discount process by selecting the GCE 1006. Upon selecting the GCE 1006 (e.g., the "Next" button in FIG. 10), the client app 12*y* and/or app/service 302 may make the API call shown by table 12.

TABLE 12

```
POST    /commerce/orders/{orderId}/actions/adjust
Request:
{
        distributions: [{
              OriginalOrderItem: "802x00000000001",
              Amount: -27.90,
              Taxes: [{
                      Amount:   2.25,
                      Type: "Estimated",
                    }]
        }],
        Reason: "Customer complains"
}
Response: {
        ChangeOrderId: "801x00000000011"
}
```

In the example of table 12, the client app 12*y* and/or app/service 302 performs an HTTP POST method using the listed URI where the orderId is the order ID associated with the order. Table 12 also shows the request that is to be sent in a mark-up language (e.g., JSON) format. In this example, all the distributions are grouped into a single OrderAdjustmentGroup object (see e.g., FIG. 4). The request includes a distributions field including an OriginalOrderItem data element with an ID of the original order item (e.g., "802x00000000001"), an Amount data element with a value of -27.90, a taxes field/data element including an amount data element with a value of -2.25 and a type data element including a value of "Estimated", and a reason data element/field including a value of "Customer complains". In some embodiments, the request may be appended to the URI in the POST (e.g., after the "actions/adjust" in table 12). Table 12 also shows the response that is provided to the client app 12*y* and/or app/service 302 in a mark-up language (e.g., JSON) format. The response includes a ChangeOrderId field including a change order ID (e.g., a value of "801x00000000011" in table 12).

Figure 11:
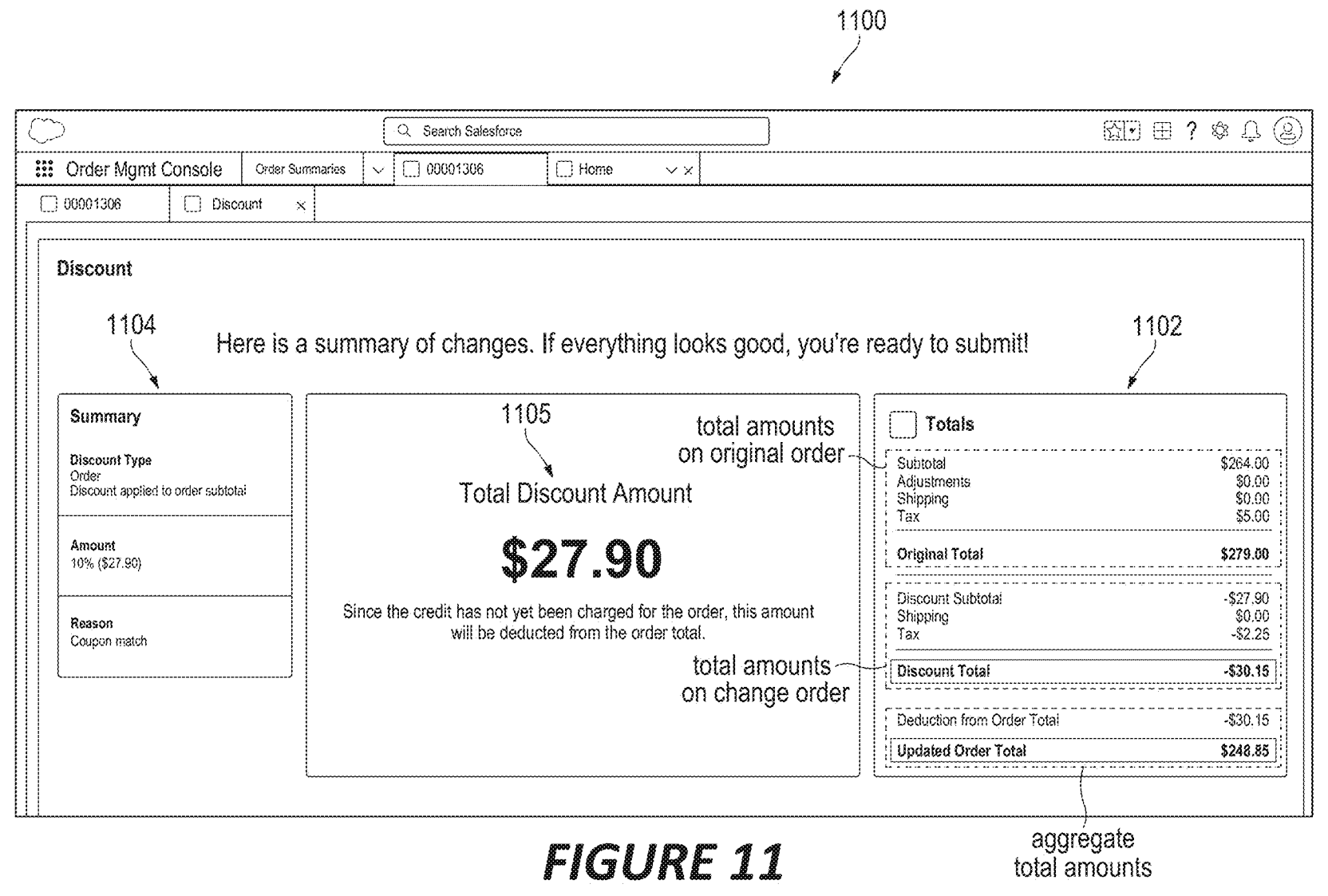

FIG. 11 shows an GUI instance 1100 to preview a summary of the total order discount according to various embodiments. GUI instance 1100 includes a discount summary graphical object 1104 indicating the discount parameters selected using GUI instance 1000 of FIG. 10. The GUI instance 1100 also includes a graphical object 1105 showing the total discount amount. The GUI instance 1100 also includes a total order discount summary graphical object 1102 indicating the state of the order with the selected changes. The total order discount summary graphical object 1102 shows the total amounts from the original order, the total amounts of the change order, and the aggregate total amounts. Rendering the GUI instance 1100 (e.g., by selecting the Next button 1006 in FIG. 10) may cause program code (e.g., a script) to be executed, which may cause the API call shown by table 13 to be made.

TABLE 13

```
GET    /commerce/orders/{changeOrderId}
Response: {
        OriginalOrderId: "801x00000000001",
        TotalAmount: 0.00,
        TotalProductAmount: 0.00,
        TotalAdjustmentAmount: -27.90,
        TotalDeliveryAmount: 0.00,
        TotalTaxAmount: 0.00,
        TotalProductTaxAmount: 0.00,
        TotalAdjustmentTaxAmount: -2.25,
        TotalDeliveryTaxAmount: 0.00,
        GrandTotalAmount: -30.15
}
```

In the example of table 13, the client app 12*y* and/or app/service 302 performs an HTTP GET method using the listed URI where the changeOrderId is the change order ID obtained after submitting the changes (e.g., "801x00000000011" from table 12). This allows fewer parameters to be passed to the EP 314, which may reduce computing/networking resource overhead. The GET method on the ChangeOrderId returns header information for a given change order (e.g., the response message in table 13). Table 13 also shows the response that is provided to the client app 12*y* and/or app/service 302 in mark-up language (e.g., JSON) format. The response includes an OriginalOrderId field including the order ID (e.g., "801x00000000001") of the order, and various other fields as shown by table 13 indicating the changed values of the changed order. After previewing the total order discount summary 1102, the user may commit the changes by selecting an appropriate GCE (e.g., a submit button that is the same or similar to GCE 706 of FIG. 7). Upon selecting such a GCE, the client app 12y and/or app/service 302 may make the API call shown by table 14.

TABLE 14

POST /commerce/orders/{changeOrderId}/actions/activate
Standard Platform Event: Change Order Status Change Body: {
    OrderId: "801x00000000011",
    OriginalOrderId: "801x00000000001",
    OldStatusCode: "Draft",
    NewStatusCode: "Activated"
}

In the example of table 14, the client app 12y and/or app/service 302 performs an HTTP POST method using the listed URI where the changeOrderId is the change order ID associated with the previously submitted change order (e.g., "801x00000000011" from table 12). The request is a standard platform event with a change order status body that includes an OrderId field including the change order ID associated with the previously submitted change order (e.g., "801x00000000010" from table 8), the OriginalOrderId field including the order ID of the original order (e.g., "801x00000000001"), an OldStatusCode field, and a NewStatusCode field. The OldStatusCode field includes the value "Draft" since the change order was not made permanent, and the NewStatusCode field includes the value "Activated" to commit the changes to the order. Additionally, the "activated" endpoint (e.g., the OMS service 312 and/or EP 314 of FIG. 3) may simply return 200 for success or 400 if there is any save error. In various embodiments, activation is a synchronous process.

Figure 12:
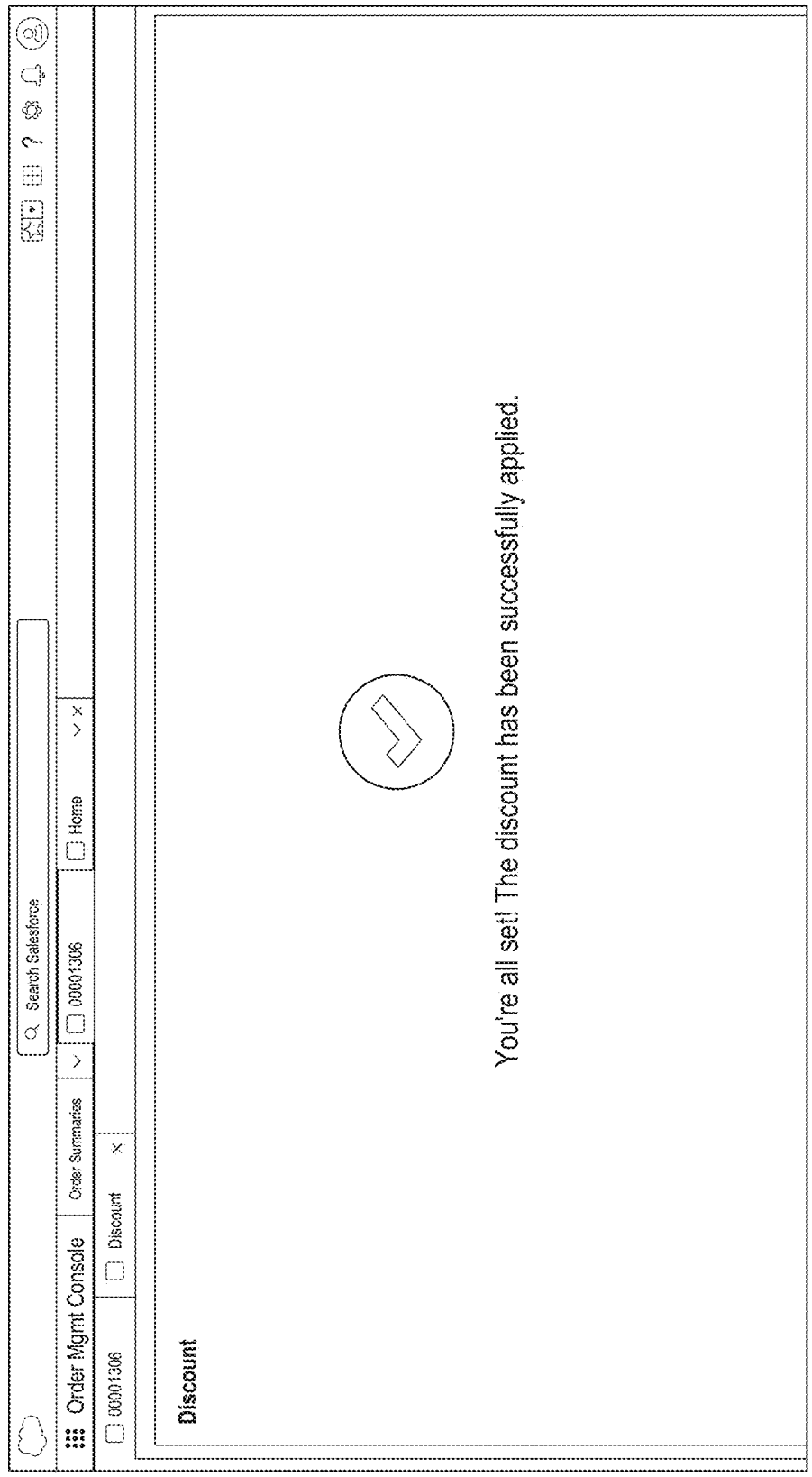

After submitting the changes to the EP 314 via the OMS service 312, the GUI instance 1200 of FIG. 12 may be rendered and displayed. Referring to FIG. 12, GUI instance 1200 indicates that the selected discount has been successfully applied. Rendering the GUI instance 1200 may cause program code (e.g., a script) to be executed, which causes an Order Activated event to take place. When the Order Activated event takes place, the API call shown by table 15 to be made.

TABLE 15

GET /commerce/orders/{orderId}?expand=...
&viewType=IncludeChanges

In the example of table 15, the client app 12y and/or app/service 302 performs an HTTP GET method using the listed URI where the orderId is the order ID of the order, and includes a parameter to include the updated changes to the order (e.g. "&viewType=IncludeChanges"). Additionally, the response to the GET method may include an order representation data element.

Figure 13:
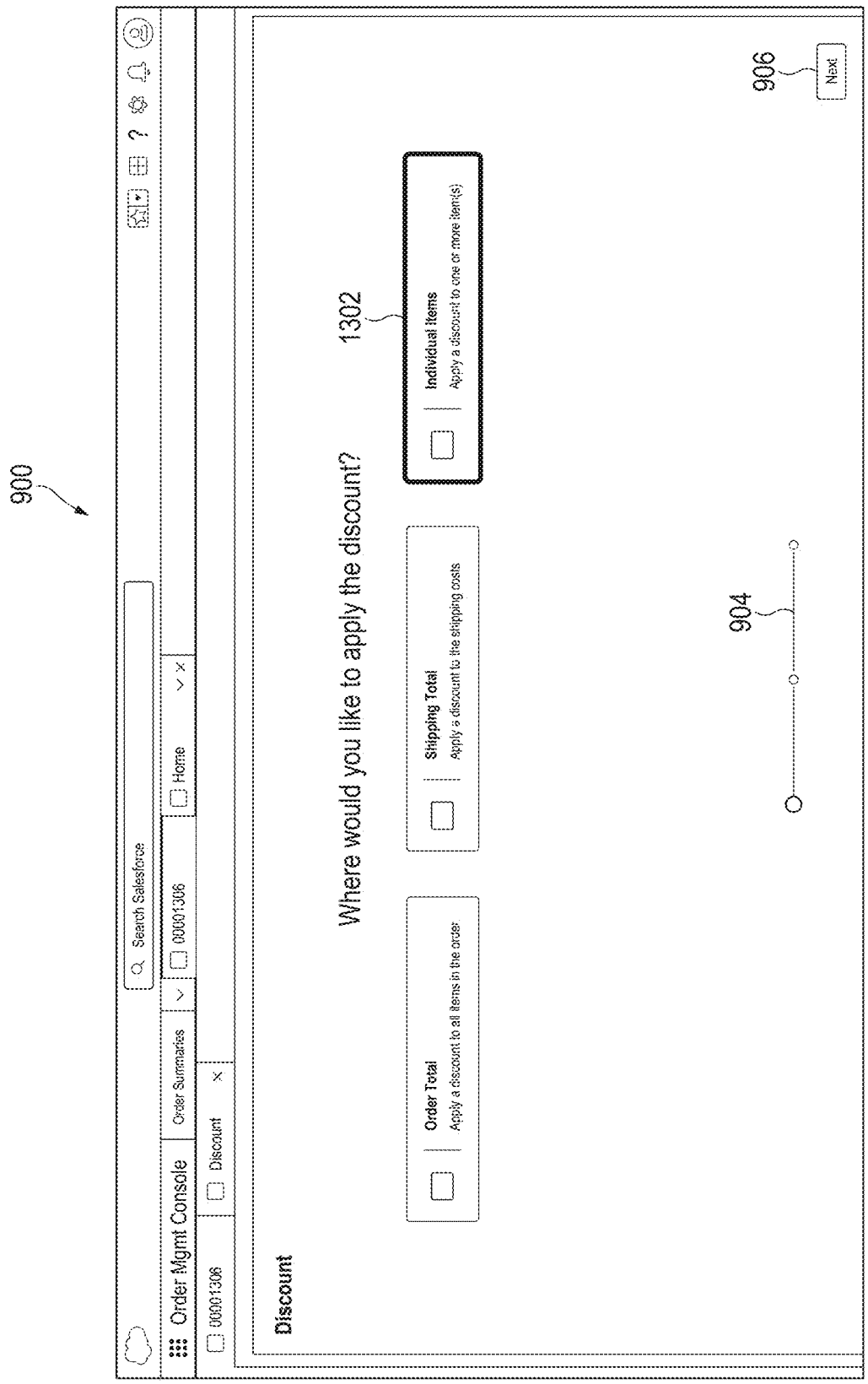

Referring now to FIG. 13, which shows the GUI instance 900 for selecting a discount to be applied to an order (see e.g., FIG. 9) where the user has selected the GCE 1302 corresponding to the "Individual Item" discount option. After selecting the discount option to be applied, the user may proceed to the next stage in the line item change process by selecting the GCE 906 (e.g., the "Next" button in FIG. 13).

Figure 14:
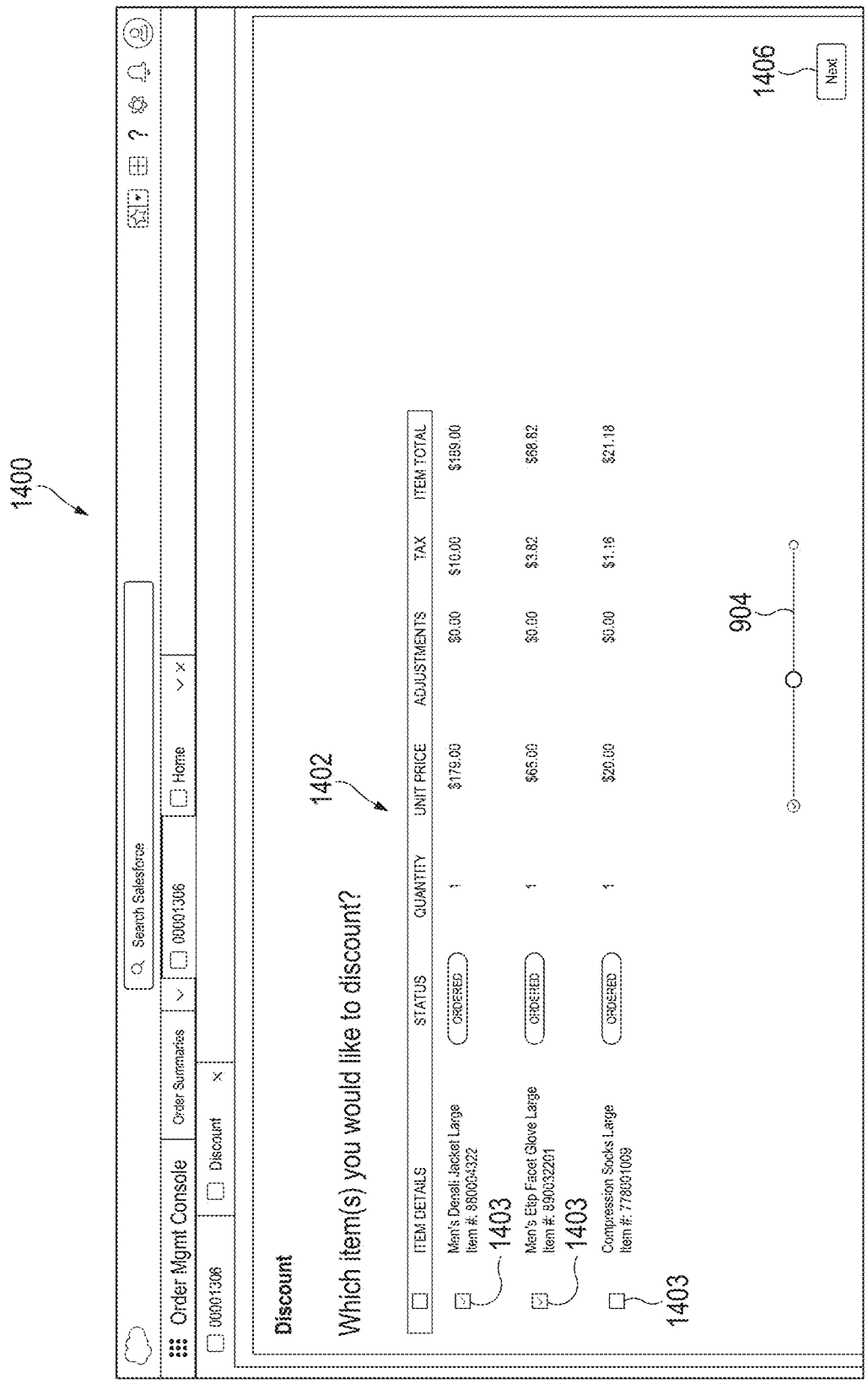

FIG. 14 shows an GUI instance 1400 for selecting individual items to be discounted according to various embodiments. As shown by FIG. 14, the GUI instance 1400 includes a DBO graphical object 1402, which graphically represents an order object. The DBO graphical object 1402 includes multiple records, each of which corresponds to an item in the order object. The DBO graphical object 1402 also includes GCEs 1403, each of which corresponds to an item in the order. The fields in the order object include a product detail field, a status field, a quantity field, a unit price field, an adjustments field, a tax field, and an item total field. In this example, the user has selected the GCE 1403 corresponding to the "Men's Denali Jacket Large Item #: 880004322" and the GCE 1403 corresponding to the "Men's Etip Facet Glove Large Item #: 890032201" (where the selected GCEs 1403 include check marks, and the corresponding records in the DBO graphical object 1402 are highlighted). After selecting the item(s) to be discounted, the user may proceed to the next stage in the reduction/cancellation process by selecting the GCE 1406 (e.g., the "Next" button in FIG. 14).

Figure 15:
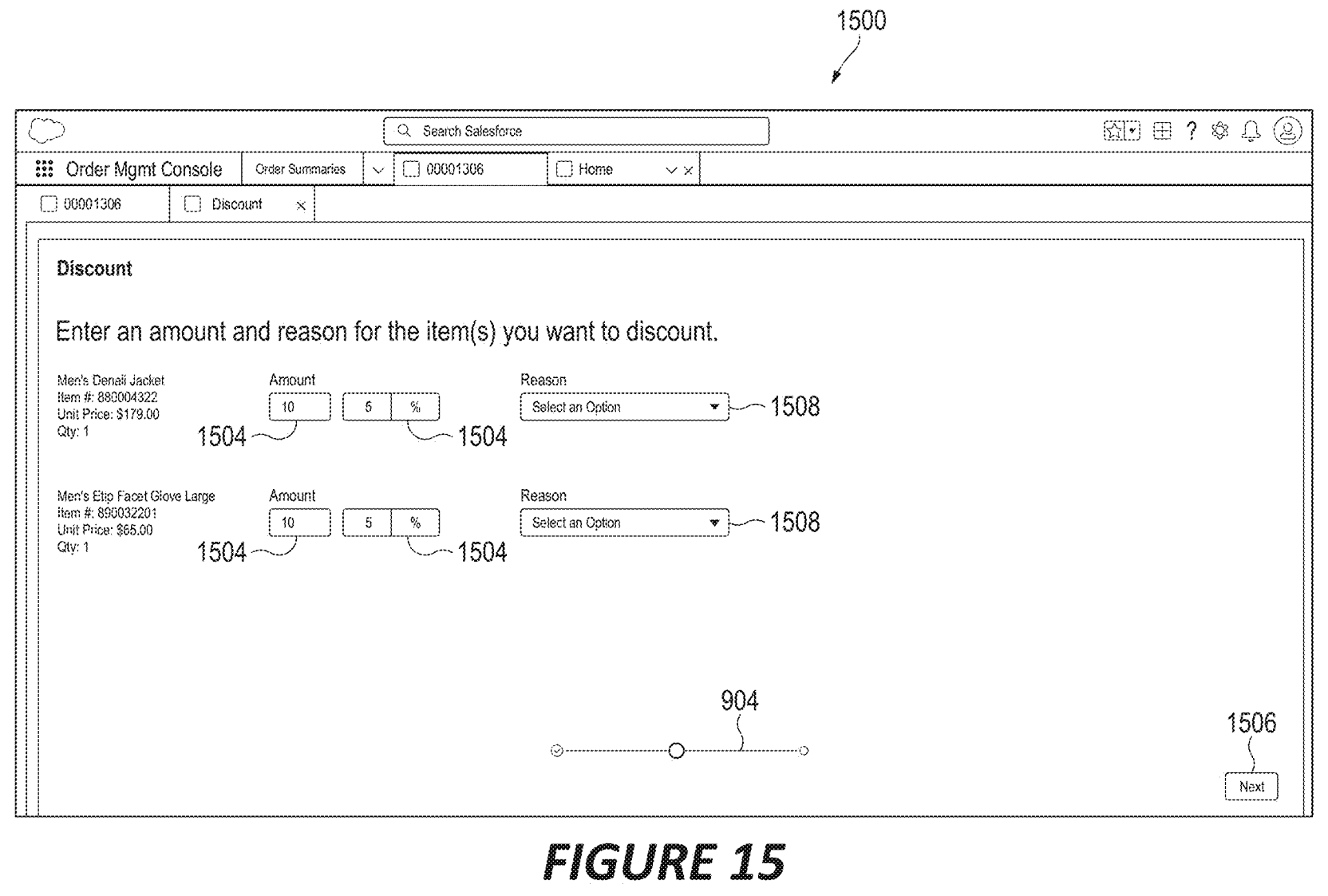

FIG. 15 shows an GUI instance 1500 for selecting discounts for the selected items according to various embodiments. The GUI instance 1500 also includes GCEs 1504 corresponding to each item selected using GUI instance 1400 of FIG. 14. The GCEs 1504 (e.g., text boxes in FIG. 15) allow the user to enter a discount amount to be applied to each item. GUI instance 1000 also includes GCEs 1508 that allow the user to select or otherwise input a reason for the discount for each item. In this example, the GCEs 1504 are text boxes and the GCEs 1508 are drop down lists that are prepopulated with a list of predefined reasons for applying the discount. In other embodiments, other GCEs may be used; for example, a text box may be included to allow the user to type the reason for the order total discount. After selecting a discount for each item and the reason for the discount for each item, the user may proceed to the next stage in the order total discount process by selecting the GCE 1506. Upon selecting the GCE 1006 (e.g., the "Next" button in FIG. 10), the client app 12y and/or app/service 302 may make respective API calls as shown by tables 16 and 17.

TABLE 16

POST /commerce/orders/{orderId}/lineItems/
{orderItemId1}/actions/adjust
Request:
{
    Adjustments: [{
        Amount: -17.90,
        Taxes: [{
            Amount: -1.44,
            Type: "Estimated"
        }]
    }],
    Reason: "Customer complains"
}
Response: {
    ChangeOrderId: "801x00000000015"
}

TABLE 17

POST /commerce/orders/{orderId}/lineItems/
{orderItemId2}/actions/adjust
Request:
{
    ChangeOrderId: "801x00000000015"
    Adjustments: [{
        Amount: -17.90, TABLE 17-continued

```
            Taxes: [{
                    Amount: -1.44,
                    Type: "Estimated"
                }]
            }],
            Reason: "Customer complains"
        }
        Response: {
            ChangeOrderId: "801x00000000015"
        }
```

In the example of table 16, the client app 12y and/or app/service 302 performs an HTTP POST method using the listed URI where the orderId is the order ID associated with the order, and orderItemId1 is an ID of the first item in the order (e.g., the "Men's Denali Jacket Large Item #: 880004322" in FIG. 15). Table 16 also shows the request that is to be sent in a mark-up language (e.g., JSON) format. The request includes an adjustments field including an Amount data element with a value of -17.90, a taxes field/data element including an amount data element with a value of -1.44 and a type data element including a value of "Estimated", and a reason data element/field including a value of "Customer complains". In some embodiments, the request may be appended to the URI in the POST (e.g., after the "actions/adjust" in table 16). Table 16 also shows the response that is provided to the client app 12y and/or app/service 302 in a mark-up language (e.g., JSON) format. The response includes a ChangeOrderId field including a change order ID (e.g., a value of "801x00000000015" in table 16).

In the example of table 17, the client app 12y and/or app/service 302 performs an HTTP POST method using the listed URI where the orderId is the order ID associated with the order, and orderItemId2 is an ID of the first item in the order (e.g., the "Men's Etip Facet Glove Large Item #: 890032201" in FIG. 15). Table 17 also shows the request that is to be sent in a mark-up language (e.g., JSON) format. The request includes a ChangeOrderId data element with an ID of the change order (e.g., "802x00000000015" returned in response to the request of table 16), and the same fields/data elements as the first request shown by table 16 (although the values included in those fields/data elements may be different based on the discount amounts entered by the user). The returned ChangeOrderId from the previous call is included in this second change order request/call so that it can be appended to the existing Change Order. In some embodiments, the request may be appended to the URI in the POST (e.g., after the "actions/adjust" in table 17). Table 17 also shows the response that is provided to the client app 12y and/or app/service 302 in a mark-up language (e.g., JSON) format. The response includes a ChangeOrderId field including the same change order ID that was returned in response to the first request/call (e.g., a value of "801x00000000015" in tables 9 and 10).

In some embodiments, a composite Order Change API call may be made, where multiple Order Change API calls are combined into a single call. In these embodiments, the EP 314 (see e.g., FIG. 3) may combine all changes into a single Change Order. An example of such a composite Order Change API is shown by table 18. In table 18, the snippet in the request may be the same or similar to the content of the request shown by tables 9 and 10.

TABLE 18

```
POST    /composite
Request: {snippet}
Response: {
            ChangeOrderId: "801x00000000015"
        }
```

Figure 16:
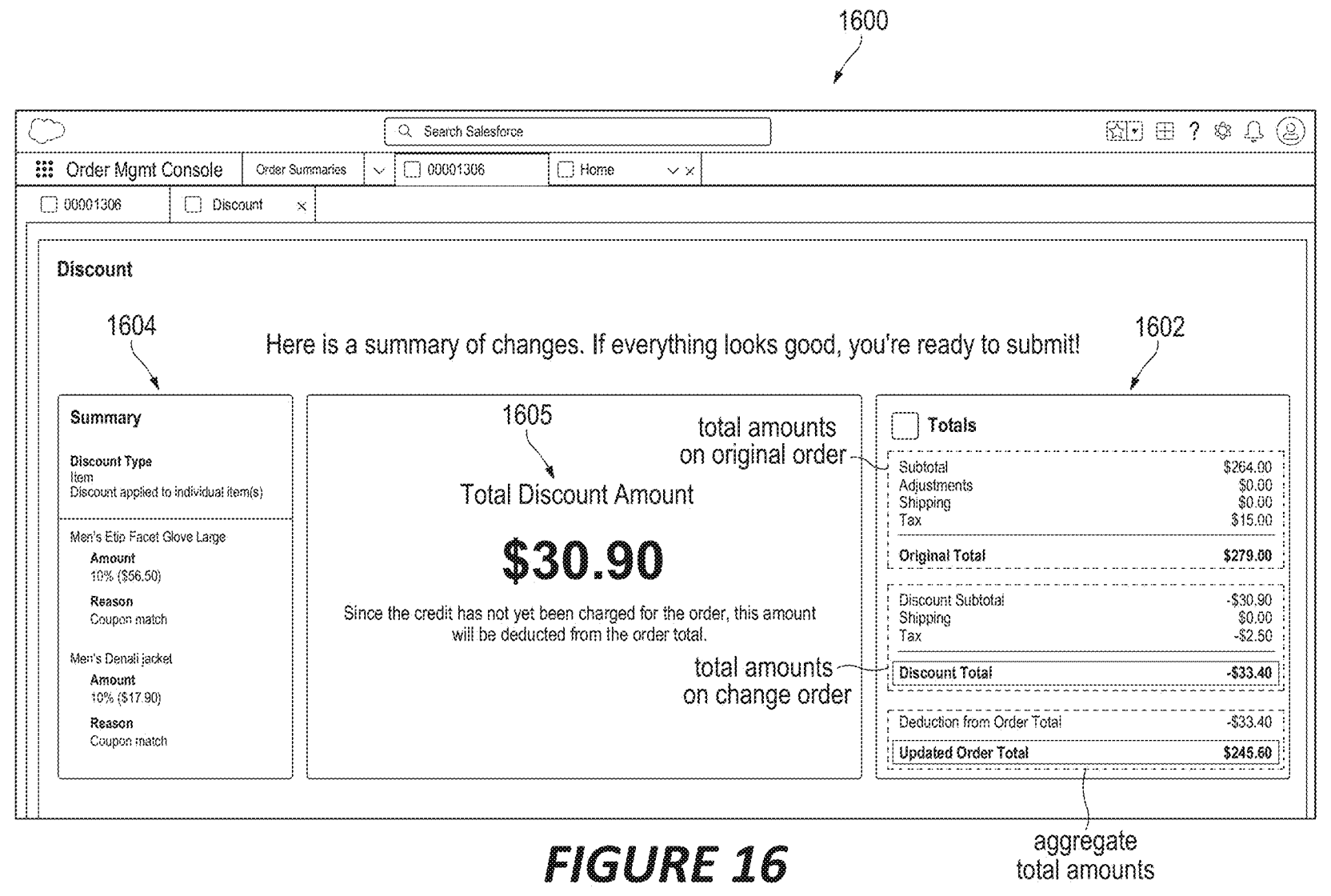

FIG. 16 shows an GUI instance 1600 to preview a summary of the order item discounts according to various embodiments. GUI instance 1600 includes a discount summary graphical object 1604 indicating the discount parameters selected using GUI instance 1500 of FIG. 15. The GUI instance 1600 also includes a graphical object 1605 showing the total discount amount to be applied. The GUI instance 1600 also includes a total order discount summary graphical object 1602 indicating the state of the order with the selected changes. The total order discount summary graphical object 1602 shows the total amounts from the original order, the total amounts of the change order, and the aggregate total amounts. Rendering the GUI instance 1600 (e.g., by selecting the Next button 1506 in FIG. 15) may cause program code (e.g., a script) to be executed, which may cause the API call shown by table 19 to be made.

TABLE 19

```
GET    /commerce/orders/{changeOrderId}
Response: {
            OriginalOrderId: "801x00000000001",
            TotalAmount: 0.00,
            TotalProductAmount: -30.90,
            TotalAdjustmentAmount: 0.00,
            TotalDeliveryAmount: 0.00,
            TotalTaxAmount: 0.00,
            TotalProductTaxAmount: -2.50,
            TotalAdjustmentTaxAmount: 0.00,
            TotalDeliveryTaxAmount: 0.00,
            GrandTotalAmount: -33.40
        }
```

In the example of table 19, the client app 12y and/or app/service 302 performs an HTTP GET method using the listed URI where the changeOrderId is the change order ID obtained after submitting the changes (e.g., "801x00000000011" from table 18). This allows fewer parameters to be passed to the EP 314, which may reduce computing/networking resource overhead. The GET method on the ChangeOrderId returns header information for a given change order (e.g., the response message in table 19). Table 19 also shows the response that is provided to the client app 12y and/or app/service 302 in mark-up language (e.g., JSON) format. The response includes an OriginalOrderId field including the order ID (e.g., "801x00000000001") of the order, and various other fields as shown by table 19 indicating the changed values of the changed order. After previewing the total order discount summary 1102, the user may commit the changes by selecting an appropriate GCE (e.g., a submit button that is the same or similar to GCE 706 of FIG. 7). Upon selecting such a GCE, the client app 12y and/or app/service 302 may make the API call shown by table 7 where the OrderId field/data element includes the present change order ID associated with the previously submitted change order (e.g., "801x00000000015"). After submitting the changes to the EP 314 via the OMS service 312, the GUI instance 1200 of FIG. 12 may be rendered and displayed, and the API call shown by table 8 may also be made.

Referring now to FIG. 17, which shows the GUI instance 900 for selecting a discount to be applied to an order (see e.g., FIG. 9) where the user has selected the GCE 1702 corresponding to the "Shipping Total" discount option. After selecting the discount option to be applied, the user may proceed to the next stage in the line item change process by selecting the GCE 906 (e.g., the "Next" button in FIG. 17).

FIG. 18 shows an GUI instance 1800 for selecting individual items to be discounted according to various embodiments. GUI instance 1800 includes different GCEs allowing the user to select a shipping total discount including a graphical object 1004 to select the entire/total shipping amount to be discounted, a GCE 1805 (e.g., a text box) which allows the user to enter a discount amount to be applied to the shipping amount, and a GCE 1807 (e.g., a text box) which allows the user to enter a discount percentage to be applied to the shipping amount. GUI instance 1800 also includes a GCE 1808 that allows the user to select or otherwise input a reason for the shipping amount discount. In this example, the GCE 1808 is a drop down list that is prepopulated with a list of predefined reasons for applying the discount. In other embodiments, other GCEs may be used, for example, a text box may be included to allow the user to type the reason for the order total discount. After selecting the discount amount and the reason for the order total discount, the user may proceed to the next stage in the order total discount process by selecting the GCE 1006. Upon selecting the GCE 1806 (e.g., the "Next" button in FIG. 18), the client app 12y and/or app/service 302 may make the API call shown by table 20.

TABLE 20

```
POST    /commerce/orders/{orderId}/lineItems/
{orderItemId}/actions/adjust
Request:
{
        Adjustments: [{
            Amount: -5.00
        }],
        Reason: "Customer complains"
}
Response: {
        ChangeOrderId: "801x00000000020"
}
```

In the example of table 20, the client app 12y and/or app/service 302 performs an HTTP POST method using the listed URI where the orderId is the order ID associated with the order, and the orderItemId is the ID of the order item to which the discount is to be applied. Table 20 also shows the request that is to be sent in a mark-up language (e.g., JSON) format. The request includes an adjustments field including an Amount data element with a value of -5.00, and a reason data element/field including a value of "Customer complains". In some embodiments, the request may be appended to the URI in the POST. Table 20 also shows the response that is provided to the client app 12y and/or app/service 302 in a mark-up language (e.g., JSON) format. The response includes a ChangeOrderId field including a change order ID (e.g., a value of "801x00000000020" in table 20).

Figure 19:
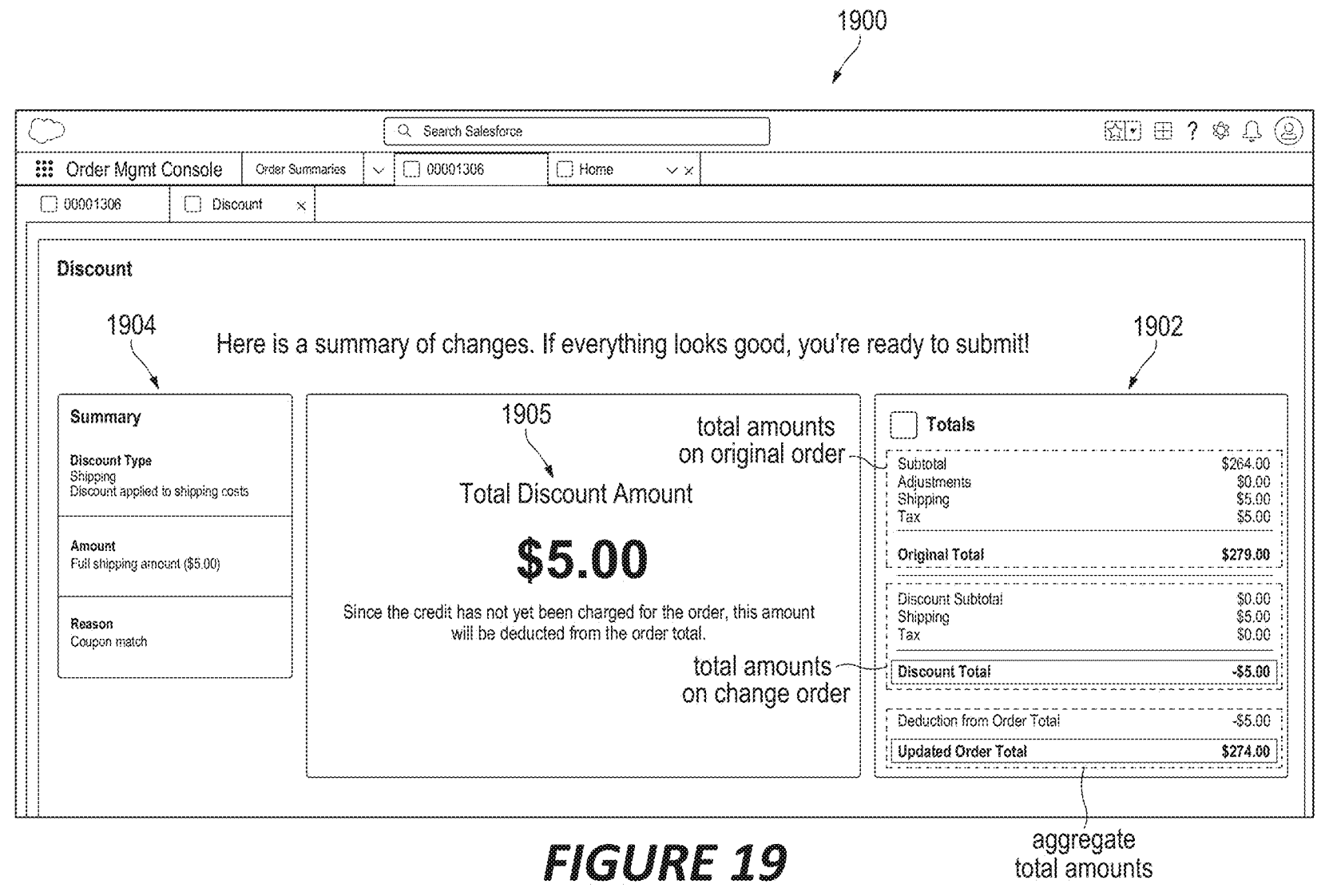

FIG. 19 shows an GUI instance 1900 to preview a summary of the order item discounts according to various embodiments. GUI instance 1900 includes a discount summary graphical object 1904 indicating the discount parameters selected using GUI instance 1800 of FIG. 18. The GUI instance 1900 also includes a graphical object 1905 showing the total discount amount to be applied (e.g., "$5.00" in FIG. 19). The GUI instance 1900 also includes a total order discount summary graphical object 1902 indicating the state of the order with the selected changes. The total order discount summary graphical object 1902 shows the total amounts from the original order, the total amounts of the change order, and the aggregate total amounts. Rendering the GUI instance 1900 (e.g., by selecting the Next button 1806 in FIG. 18) may cause program code (e.g., a script) to be executed, which may cause the API call shown by table 21 to be made.

TABLE 21

```
GET    /commerce/orders/{changeOrderId}
Response: {
        OriginalOrderId: "801x00000000001",
        TotalAmount: 0.00,
        TotalProductAmount: 00.00,
        TotalAdjustmentAmount: 0.00,
        TotalDeliveryAmount: -5.00,
        TotalTaxAmount: 0.00,
        TotalProductTaxAmount: 0.00,
        TotalAdjustmentTaxAmount: 0.00,
        TotalDeliveryTaxAmount: 0.00,
        GrandTotalAmount: -5.00
}
```

In the example of table 21, the client app 12y and/or app/service 302 performs an HTTP GET method using the listed URI where the changeOrderId is the change order ID obtained after submitting the changes (e.g., "801x00000000020" from table 20). The GET method on the ChangeOrderId returns header information for a given change order (e.g., the response message in table 21). Table 21 also shows the response that is provided to the client app 12y and/or app/service 302 in mark-up language (e.g., JSON) format. The response includes an OriginalOrderId field including the order ID (e.g., "801x00000000001") of the order, and various other fields as shown by table 21 indicating the changed values of the changed order. After previewing the total order discount summary 1102, the user may commit the changes by selecting an appropriate GCE (e.g., a submit button that is the same or similar to GCE 706 of FIG. 7). Upon selecting such a GCE, the client app 12y and/or app/service 302 may make the API call shown by table 7 where the OrderId field/data element includes the present change order ID associated with the previously submitted change order (e.g., "801x00000000020"). After submitting the changes to the EP 314 via the OMS service 312, the GUI instance 1200 of FIG. 12 may be rendered and displayed, and the API call shown by table 8 may also be made.

In any of the aforementioned embodiments, multiple actions could be combined into a single change order. For example, a cancellation change order may be combined with a discount change order.

In any of the aforementioned embodiments, an authorization protocol may be used to allow users and/or apps 12y to securely access data without having to reveal their credentials (e.g., username and password, digital signatures, digital certificates, etc.). Before making the Order API calls, the client app 12y, apps/services 302, and/or the OMS service 312 (see e.g., FIG. 3) authenticate the user, client app 12y and/or app/service 302 using the authorization protocol. Examples of such authorization protocols may include OAuth, Security Assertion Markup Language (SAML), OpenID, eXtensible Access Control Markup Language (XACML), and/or the like. In an example where OAuth 2.0 is used as the authorization protocol, the client app 12y and/or app/service 302 are authenticated via one of several different OAuth 2.0 authentication flows. An OAuth authentication flow defines a series of steps used to coordinate the authentication process between the client app 12*y* and/or app/service 302 and the OMS 350. Supported OAuth flows include: web server flows (where the server can securely protect the consumer secret); user-agent flows (used by applications that cannot securely store the consumer secret); and username-password flows (where the application has direct access to user credentials). Authentication requests are sent to specific endpoints, which are URLs used to make authentication requests. After successfully authenticating the app/user with the OMS 350, the client app 12*y* and/or app/service 302 receives an access token which can be used to make the Order API calls. The previously described requests are sent to the same or different endpoints, which uniquely identify the functionality provided the payload of the requests.

In any of the aforementioned embodiments, the EP 314 may store the values provided in the request messages discussed previously, the adjusted/altered state of the order object (e.g., the order object state with the calculated changes applied to the order object) in association with the change order ID (see e.g., the request parameters in tables 8, 12, 16-18, and 20 supra). In these embodiments, the EP 314 may commit the changes to the underlying order data (e.g., by writing the changes to system 16) in response to receipt of a commit/activation request (see e.g., tables 10 and 14 supra). In these embodiments, the EP 314 may utilize a suitable temporary storage mechanism to store the values including, for example, buffers, web caching system(s), a remote direct memory access (RDMA) system, memcached/memcacheDB, and/or the like. In these embodiments, the client app 12*y* and/or app/service 302 may submit the change order ID to commit the changes without having to pass all of the change parameters to the system 16 (see e.g., tables 2, 6, 12, and 14 supra). In some embodiments, when the user submits new values in another request, the stored values may be replaced with the new values, and a new change order ID may be determined and provided to the client app 12*y* and/or app/service 302. The EP 314 may determine the change order ID for a request using a random number generator, a hash function to calculate a hash of the submitted values and/or other relevant values (e.g., user or organization ID, or the like), and/or using any other suitable mechanism. Additionally, the change order ID is returned in the response to indicate successful completion of the transaction (e.g., storage of the request parameters and calculation of the requested changes to the order). Additionally or alternatively, a suitable HTTP status code could be returned to indicate success (e.g., 200 ("OK"), 202 ("Accepted"), 205 ("Reset Content"), a custom status code, and/or the like). Otherwise, an error message or status code (e.g., 4XY status code, where X and Y are numbers) may be returned to indicate an unsuccessful transaction.

Figure 20:
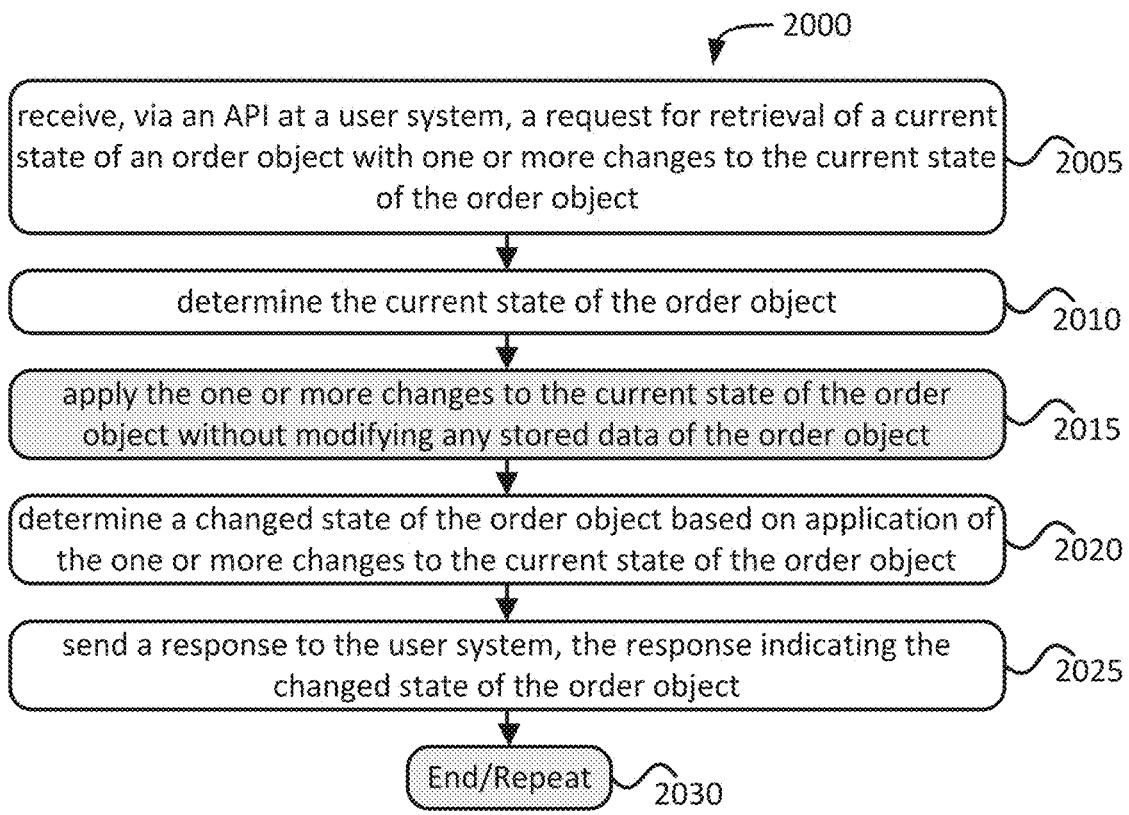
FIGS. 20-21 show example processes for carrying out the various embodiments discussed herein.
Figure 21:
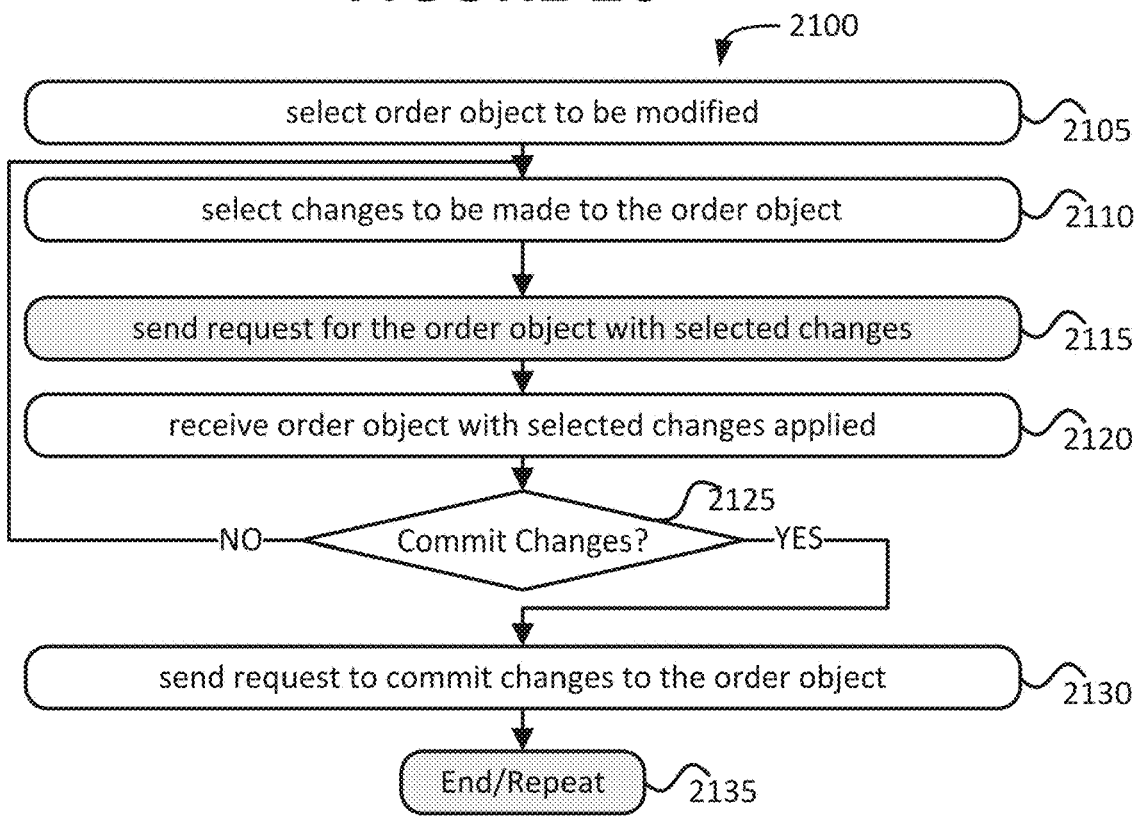

FIGS. 20-21 illustrate processes 2000 and 2100, respectively, for practicing aspects of the embodiments discussed herein. For illustrative purposes, the operations of processes 2000 and 2100 is described as being performed by elements/components shown and described with regard to FIGS. 1A-17. However, other computing devices may operate processes 2000-2100 in a multitude of implementations, arrangements, and/or environments. In embodiments, the computer system(s) includes program code stored in a memory system, which when executed by a processor system, is configurable to the computer system(s) to perform the various operations of processes 2000 and 2100. While particular examples and orders of operations are illustrated in FIGS. 20 and 21, in various embodiments, these operations may be re-ordered, separated into additional operations, combined, or omitted altogether.

Referring now to FIG. 20, which shows an order management process 2000 performed by an ecommerce platform (EP) 314 (see e.g., FIG. 3). Process 2000 begins at operation 2005 where the EP 314 receives a request via an Order API 32. In embodiments, the request is for retrieval of a current state of an order object with one or more changes to the current state of the order object. In particular, the request (or payload or body portion of the request message) may indicate an order ID and/or order item ID with parameters/data elements for each of the one or more changes to be made to the order object. In response to receipt of the request, at operation 2010 the EP 314 determines the current state of the order object. In embodiments, the EP 314 may query a tenant space 112 for order objects in a tenant DB 22 (see e.g., FIG. 1B). At operation 2015, the EP 314 applies the one or more changes to the current state of the order object without modifying any stored data of the order object, and at operation 2020, the EP 314 determines a changed state of the order object based on application of the one or more changes to the current state of the order object. At operation 2025, the EP 314 sends a response to the requesting entity (e.g. an app/service 302 operated by a CP 50, a client application 12*y* operated by a user system 12, or the like). In embodiments, the response indicates the changed state of the order object. At operation 2030 process 2000 ends or repeats as necessary.

Referring now to FIG. 21, which shows an order management process 2000 performed by a CP app, which may be operated by various hardware elements of a CP 50 and/or various hardware elements of a user system 12. Process 2100 begins at operation 2105 where the CP app selects an order object to be modified. In some embodiments, operation 2105 includes rendering/displaying a first instance of a GUI including a GCE, where the GCE is for modification of an existing order object stored by a remote database system. At operation 2110, the CP app selects changes to be made to the order object. In some embodiments, operation 2110 includes detecting an input to the GCE in the first instance of the GUI, where the input includes one or more selected changes to the order object.

At operation 2115, the CP app sends a request for the order object with the selected changes. In some embodiments, operation 2115 involves invoking an Order API 32 to send the request to the ecommerce platform 314 via the OMS service 312. In these embodiments, the request is for a current state of the order object with the one or more selected changes to the current state of the order object. At operation 2120, the CP app receives the order object with the selected changes applied. In some embodiments, operation 2120 involves rendering/displaying a second instance of the GUI including a graphical object indicating the changed state of the order object.

At operation 2125, the CP app determines whether the selected changes should be committed or activated. In some embodiments, operation 2125 includes detecting an input to a GCE in the second instance of the GUI, where the input includes an instruction to commit or activate the selected changes to the order object. If at operation 2125, the CP app determines that the changes should not be committed, then the CP app proceeds back to operation 2110 to select different or new changes to be made to the order object. If at operation 2125, the CP app determines that the changes should be committed, then the CP app proceeds to operation

2130 to select send a request to commit the changes to the order object. At operation 2135 process 2000 ends or repeats as necessary.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, for example, ORACLE®, DB2® by IBM®, and the like without departing from the scope of the implementations claimed.

It should also be understood that some of the disclosed implementations can be embodied in the form of various types of hardware, software, firmware, middleware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Python, PyTorch, NumPy, Ruby, Ruby on Rails, Scala, Smalltalk, Java™, C++, C #, "C", Rust, Go (or "Golang"), JavaScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), Extensible Markup Language (XML), RESTful API Modeling Language (RAML), wiki markup or Wikitext, Wireless Markup Language (WML), Java Script Object Notion (JSON), Apache® MessagePack™ Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Salesforce® Apex®, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), and/or any other programming language or development tools including proprietary programming languages and/or development tools. Furthermore, some or all of the software components or functions described herein can utilize a suitable querying language to query and store information in one or more databases or data structures, such as, for example, Structure Query Language (SQL), object query language (OQL), Salesforce® OQL (SOQL), Salesforce® object search language (SOSL), Salesforce® analytics query language (SAQL), and/or other query languages. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, includes a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable storage media (NTCRSM) comprising instructions for providing order management services, wherein execution of the instructions by one or more processors of a cloud computing system is to cause the cloud computing system to:
   receive a request via an application programming interface (API) at a user system associated with an ecommerce platform after activation of an order object by the ecommerce platform, the activation being in response to an order being placed with the ecommerce platform, and the request is for retrieval of a current state of the order object and the request including one or more changes to be applied to the current state of the order object;
   in response to receipt of the request, determine the current state of the order object;
   apply the one or more changes to the current state of the order object without modifying any stored data of the order object;
   determine a changed state of the order object based on the applied one or more changes to the current state of the order object; and
   send a response to the user system, the response indicating the changed state of the order object as if the one or more changes were applied to the order object.

2. The one or more NTCRSM of claim 1, wherein the one or more changes include one or more of an order status change, an order quantity change, or a line item change.

3. The one or more NTCRSM of claim 2, wherein the one or more changes include the order status change, and execution of the instructions is to cause the cloud computing system to:
   change a status of the order object to a status value indicated by a status parameter in the request, wherein the status of the order object is a draft status or an activated status.

4. The one or more NTCRSM of claim 2, wherein the one or more changes include the order quantity change, and execution of the instructions is to cause the cloud computing system to:
   adjust a quantity of the order object using a quantity value indicated by a quantity parameter in the request.

5. The one or more NTCRSM of claim 2, wherein the one or more changes include the line item change, and execution of the instructions is to cause the cloud computing system to:

adjust a price of the order object using a price value indicated by a price parameter in the request.

6. The one or more NTCRSM of claim 5, wherein the price parameter includes one or more of a tax amount parameter, a discount amount parameter, or a shipping cost parameter.

7. The one or more NTCRSM of claim 1, wherein the request includes a reason parameter including a value indicating a reason for the one or more changes.

8. The one or more NTCRSM of claim 1, wherein the request is a first request, and execution of the instructions is to cause the cloud computing system to:
in response to receipt of the first request, generate a change order identifier (ID) for the one or more changes;
store values for the one or more changes provided in the request in association with the change order ID;
receive a second request via the API at the user system, the request is for activation of the order object with the one or more changes to the current state of the order object; and
in response to receipt of the second request, modify the stored data of the order object to apply the one or more changes to the current state of the order object.

9. A client computing system comprising:
a network interface;
a memory system comprising program code of a client application; and
a processor system coupled with the memory system and the network interface, and execution of the program code by the processor system is configurable to cause the processor system to:
render a first instance of a graphical user interface (GUI) associated with an ecommerce platform after activation of an existing order object by the ecommerce platform, the activation being in response to an order being placed with the ecommerce platform, and the GUI including a graphical control element (GCE), the GCE for modification of the order object stored by a remote database system;
detect input to the GCE, the input including one or more selected changes to the order object;
invoke an application programming interface (API) to send a request to the remote database system via the network interface, the request being for a current state of the order object with the one or more selected changes to the current state of the order object without modification of any stored data of the order object; and
in response to receipt of a response via the network interface, render a second instance of the GUI including a graphical object, the graphical object indicating the changed state of the order object as if the stored data of the order object were modified.

10. The computing system of claim 9, wherein the one or more changes include one or more of an order status change, an order quantity change, or a line item change.

11. The computing system of claim 10, wherein execution of the program code is configurable to cause the processor system to:
change a status of the order object to a status value indicated by a status parameter in the request when the one or more changes include the order status change, and the status of the order object is a draft status or an activated status.

12. The computing system of claim 10, wherein execution of the program code is configurable to cause the processor system to:

adjust a quantity of the order object using a quantity value indicated by a quantity parameter in the request when the one or more changes include the order quantity change; and
adjust a price of the order object using a price value indicated by a price parameter in the request when the one or more changes include the line item change, the price parameter includes one or more of a tax amount parameter, a discount amount parameter, or a shipping cost parameter.

13. The computing system of claim 9, wherein the request includes a reason parameter including a value indicating a reason for the one or more changes.

14. The computing system of claim 9, wherein the GCE is a first GCE, the second instance of the GUI includes a second GCE, and execution of the program code is configurable to cause the processor system to:
detect input to the second GCE, the input including an instruction to activate the order object with the applied one or more selected changes; and
in response to detection of the input to the second GCE, invoke the API to send an activation request to the remote database system via the network interface, the activation request being for activation of the order object with the one or more selected changes applied to the order object.

15. A method for providing order management services to a ecommerce platform by a cloud computing service, the method comprising:
receiving, from the ecommerce platform after activation of an order object by the ecommerce platform, a request via an application programming interface (API) at an application operated by the ecommerce platform, the request being for retrieval of a current state of the order object and including one or more changes to the current state of the order object, wherein the activation is in response to an order being placed with the ecommerce platform;
determining the current state of the order object in response to receipt of the request;
applying the one or more changes to the current state of the order object without modifying any stored data of the order object;
determining a changed state of the order object based on application of the one or more changes to the current state of the order object; and
sending a response to the user system, the response indicating the changed state of the order object as if the stored data of the order object were modified.

16. The method of claim 15, wherein the one or more changes include one or more of an order status change, an order quantity change, or a line item change.

17. The method of claim 16, further comprising:
changing a status of the order object to a status value indicated by a status parameter in the request when the one or more changes include the order status change, and the status of the order object is a draft status or an activated status.

18. The method of claim 16, further comprising:
adjusting a quantity of the order object using a quantity value indicated by a quantity parameter in the request when the one or more changes include the order quantity change; and
adjusting a price of the order object using a price value indicated by a price parameter in the request when the one or more changes include the line item change, and the price parameter includes one or more of a tax amount parameter, a discount amount parameter, or a shipping cost parameter.

19. The method of claim 16, wherein the request is a first request, and the method further comprises:
generating, in response to receipt of the first request, a change order identifier (ID) for the one or more changes;
storing values for the one or more changes provided in the request in association with the change order ID;
receiving a second request via the API at the user system, the request is for activation of the order object with the one or more changes to the current state of the order object; and
modifying, in response to receipt of the second request, the stored data of the order object to apply the one or more changes to the current state of the order object.

20. The method of claim 15, wherein the request includes a reason parameter including a value indicating a reason for the one or more changes.

\* \* \* \* \*